(12) United States Patent
Hayashi et al.

(10) Patent No.: US 9,731,281 B2
(45) Date of Patent: Aug. 15, 2017

(54) CATALYST FOR HYDROCARBON CATALYTIC CRACKING

(71) Applicant: JGC CATALYSTS AND CHEMICALS LTD., Kawasaki-shi, Kanagawa (JP)

(72) Inventors: Shigenori Hayashi, Kitakyushu (JP); Seiji Arakawa, Kitakyushu (JP); Shingo Sakai, Kitakyushu (JP)

(73) Assignee: JGC CATALYSTS AND CHEMICALS LTD., Kawasaki-shi (JP)

( * ) Notice: Subject to any disclaimer, the term of this patent is extended or adjusted under 35 U.S.C. 154(b) by 350 days.

(21) Appl. No.: 14/422,241

(22) PCT Filed: Jul. 12, 2013

(86) PCT No.: PCT/JP2013/069197
§ 371 (c)(1),
(2) Date: Feb. 18, 2015

(87) PCT Pub. No.: WO2014/027537
PCT Pub. Date: Feb. 20, 2014

(65) Prior Publication Data
US 2015/0202605 A1 Jul. 23, 2015

(30) Foreign Application Priority Data

Aug. 17, 2012 (JP) ................. 2012-181186

(51) Int. Cl.
| | | |
|---|---|---|
| *B01J 29/06* | (2006.01) | |
| *B01J 29/80* | (2006.01) | |
| *C10G 11/18* | (2006.01) | |
| *B01J 37/28* | (2006.01) | |
| *B01J 37/30* | (2006.01) | |
| *B01J 23/847* | (2006.01) | |
| *B01J 21/16* | (2006.01) | |
| *B01J 29/08* | (2006.01) | |
| *B01J 37/02* | (2006.01) | |
| *B01J 35/08* | (2006.01) | |
| *B01J 37/00* | (2006.01) | |
| *B01J 35/02* | (2006.01) | |

(52) U.S. Cl.
CPC .............. *B01J 29/80* (2013.01); *B01J 21/16* (2013.01); *B01J 23/8472* (2013.01); *B01J 29/087* (2013.01); *B01J 29/088* (2013.01); *B01J 37/0203* (2013.01); *B01J 37/28* (2013.01); *B01J 37/30* (2013.01); *C10G 11/18* (2013.01); *B01J 29/08* (2013.01); *B01J 29/085* (2013.01); *B01J 35/023* (2013.01); *B01J 35/08* (2013.01); *B01J 37/0045* (2013.01); *B01J 37/0201* (2013.01); *B01J 2029/062* (2013.01); *B01J 2229/186* (2013.01); *B01J 2229/36* (2013.01); *B01J 2229/42* (2013.01)

(58) Field of Classification Search
CPC ........ B01J 29/80; B01J 29/088; B01J 29/085; B01J 2029/062; B01J 2229/42; B01J 2229/36; B01J 2229/186; B01J 2229/37; B01J 35/023; B01J 35/08; B01J 37/0045; B01J 37/0203; B01J 37/0201; B01J 37/28; B01J 37/0009
USPC .............................. 502/64, 65, 67, 73, 79, 8
See application file for complete search history.

(56) References Cited

U.S. PATENT DOCUMENTS

| | | | |
|---|---|---|---|
| 4,477,336 A | | 10/1984 | Scherzer |
| 4,661,239 A | * | 4/1987 | Steigleder .............. B01J 29/084 |
| | | | 208/111.15 |
| 5,227,352 A | | 7/1993 | Tsujii et al. |
| 5,954,947 A | | 9/1999 | Mignard et al. |
| 6,656,346 B2 | | 12/2003 | Ino et al. |
| 2003/0064881 A1 | | 4/2003 | Du et al. |
| 2004/0254060 A1 | | 12/2004 | Du et al. |
| 2007/0082809 A1 | | 4/2007 | Choi et al. |
| 2012/0205286 A1 | | 8/2012 | Francis et al. |

FOREIGN PATENT DOCUMENTS

| | | |
|---|---|---|
| EP | 2 474 357 A1 | 7/2012 |
| JP | S60-193543 A | 10/1985 |
| JP | S63-267442 A | 11/1988 |
| JP | H04-305248 A | 10/1992 |
| JP | H05-16908 B2 | 3/1993 |
| JP | H05-98271 A | 4/1993 |
| JP | H08-173816 A | 7/1996 |
| JP | H10-130661 A | 5/1998 |
| JP | 2002-241764 A | 8/2002 |
| JP | 2003-226519 A | 8/2003 |
| JP | 2004-526655 A | 9/2004 |
| JP | 2009-000657 A | 1/2009 |

(Continued)

OTHER PUBLICATIONS

Aug. 6, 2013 Search Report issued in International Application No. PCT/JP2013/069197.
Apr. 14, 2017 Search Report issued in Russian Patent Application No. 2015109131.

*Primary Examiner* — Elizabeth Wood
(74) *Attorney, Agent, or Firm* — Oliff PLC

(57) ABSTRACT

A catalyst for hydrocarbon catalytic cracking of the invention contains: a catalyst (a) containing faujasite-type zeolite (A) having a unit cell size in a range of 2.435 nm to 2.455 nm, a matrix component, and rare earths; and a catalyst (b) containing faujasite-type zeolite (B) having a unit cell size in a range of 2.445 nm to 2.462 nm, a matrix component, phosphorus, and magnesium.

9 Claims, No Drawings

(56) References Cited

FOREIGN PATENT DOCUMENTS

| JP | 2009-511245 A | 3/2009 |
|----|---------------|--------|
| JP | 2010-110698 A | 5/2010 |
| RU | 2317143 C2 | 2/2008 |
| RU | 2412760 C2 | 2/2011 |
| WO | 2009/145311 A1 | 12/2009 |

\* cited by examiner

CATALYST FOR HYDROCARBON CATALYTIC CRACKING

TECHNICAL FIELD

The present invention relates to a catalyst for hydrocarbon catalytic cracking. More specifically, it relates to a catalyst for hydrocarbon catalytic cracking to be applied to heavy hydrocarbons containing metal (e.g., nickel and vanadium) and a sulfur compound.

BACKGROUND ART

In a typical catalytic cracking of heavy hydrocarbons containing metal such as nickel and vanadium, it is well known that the metal (e.g., vanadium) deposited on a catalyst breaks a crystalline structure of an active component (crystalline aluminosilicate (generally also referred to as zeolite) of the catalyst, leading to a significant decline in an activity of the catalyst. In order to solve this problem, various catalysts are proposed.

Patent Literature 1 discloses a catalyst for hydrocarbon catalytic cracking containing: (1) an alumina particle having a particle diameter of 2 to 60 µm and including a phosphorus component and at least one metallic component selected from an alkaline earth metal and a rare earth metal; (2) zeolite; and (3) a porous inorganic oxide matrix in which the alumina particle (1) and zeolite (2) are evenly dispersed. It is disclosed that this catalyst exhibits a metal tolerance, a high activity and selectivity and inhibits generation of hydrogen and coke.

Patent Literature 2 discloses a catalyst composition for fluid catalytic cracking of hydrocarbon, containing components of alumina, zeolite, and a matrix of an inorganic oxide other than alumina, each of the components containing a phosphorus atom. It is disclosed that, when this catalyst is used for heavy hydrocarbon catalytic cracking, the catalyst exhibits an excellent bottom (bottom oil) cracking ability, generate only a low amount of hydrogen and coke, and increases fractions of gasoline, kerosene and light oil.

Patent Literature 3 discloses a porous molecular sieve catalyst having hydrothermal stability, which is obtained by water evaporation of a feedstock mixture including: (1) a molecular sieve having a surface pore modified by a specific phosphate and having a skeleton of —Si—OH—Al—; (2) a water-insoluble metal salt; and (3) a phosphate compound. It is disclosed that this catalyst has a high hydrothermal tolerance and improves a gas-olefin yield and gas-olefin selectivity.

Patent Literature 4 discloses a manufacturing method of a catalyst for catalytic cracking including: spray-drying aqueous slurry in a form of a mixture including air-calcined alumina, clay including silica and alumina as main components, a precursor of a silica inorganic oxide, and zeolite to provide spherical microparticles; washing the microparticles so as to have a content of an alkali metal oxide at 1.0 mass % or less; and introducing rare earths into the microparticles. It is disclosed that, when this catalyst is used for catalytic cracking of heavy hydrocarbon oil containing a large amount of metal, this catalyst exhibits a high cracking activity and a high gasoline selectivity, generates coke and gas at a low amount, and further has a high hydrothermal tolerance.

Patent Literature 5 discloses a catalyst for fluid catalytic cracking of hydrocarbon oil, the catalyst containing two or more of catalyst compositions containing zeolite and an inorganic oxide matrix formed of an active matrix component and an inactive matrix component, in which each of the catalyst compositions contains zeolite at different amounts (including a case where one of the catalyst compositions contains no zeolite). It is disclosed that, when this catalyst is used, gasoline and an intermediate fraction can be obtained at a high yield while a yield of coke can be lowered, and further a high bottom cracking ability, in other words, a low yield of a heavy fraction can be achieved.

Patent Literature 6 discloses a catalyst for fluid catalytic cracking of hydrocarbon oil, the catalyst containing: a catalyst composition A containing zeolite and a silica binder of 10 to 30 mass % as a binding agent; and a catalyst composition B containing zeolite and an aluminum compound binder of 10 to 30 mass % as a binding agent, in which the catalyst composition A of a mass ($W_A$) is blended with the catalyst composition B of a mass ($W_B$) at any mass ratio ($W_A:W_B$) within a range of 10:90 to 90:10. It is disclosed that, when this catalyst is used, gasoline and a light oil fraction can be obtained at a high yield while a yield of coke can be lowered, and further a high bottom cracking ability can be achieved, in other words, generation of a heavy fraction can be inhibited.

CITATION LIST

Patent Literature(s)

Patent Literature 1: JP-A-5-16908
Patent Literature 2: JP-A-8-173816
Patent Literature 3: JP-A-2009-511245
Patent Literature 4: JP-A-60-193543
Patent Literature 5: JP-A-2010-110698
Patent Literature 6: WO2009/145311

SUMMARY OF THE INVENTION

Problem(s) to be Solved by the Invention

The catalyst disclosed in Patent Literature 1 exhibits improved metal tolerance, activity, selectivity and the like. However, such an improvement in the activity and selectivity is attributed to an improvement in metal tolerance. A gasoline yield, selectivity and the like are still insufficient, which may be caused by the rare earths not being supported on zeolite, and need to be further improved.

Also in the catalyst disclosed in Patent Literature 2, although metal tolerance, activity, selectivity and the like are improved, such an improvement in the activity and selectivity is attributed to an improvement in metal tolerance by containing phosphorous. A gasoline yield, selectivity and the like are still insufficient and need to be further improved. Further, it is shown in Example of Patent Literature 2 that the rare earths were supported. Herein, although the activity and the selectivity are improved, a further improvement in the metal tolerance, activity and selectivity is required. Moreover, as similar to later-described Patent Literature 4, when an amount of the rare earths to be supported is increased in order to improve the activity and the selectivity, a use ratio of the rare earths is unfavorably lowered.

In the catalyst of Patent Literature 3, even if the hydrothermal tolerance is improved, a gas olefin yield and gas olefin selectivity are raised to adversely lower a gasoline yield and gasoline selectivity.

Further, introduction conditions are examined in order to improve the use ratio of the rare earths. When pH at the time of introducing the rare earths in Patent Literature 4 falls out of the range of 4.5 to 5.5, for instance, when pH is at 4 or less, the use ratio of the rare earths is lowered. When pH exceeds 6, the use ratio of the rare earths is improved, but the rare earths is deposited or double salts are generated, which may cause an insufficient improvement in the performance of the catalyst.

The fluid catalytic cracking catalysts disclosed in Patent Literatures 5 and 6 may not always provide sufficient advantages. Further, a content of the rare earths is required to be reduced as much as possible in terms of availability and economical reasons.

An object of the invention is to provide a catalyst for hydrocarbon catalytic cracking (hereinafter, also referred to as a hydrocarbon catalytic cracking catalyst), which exhibits an excellent hydrothermal stability, a high residual oil (bottom) cracking ability and an excellent selectivity (a high liquid yield, a low gas and a low coke) even with a less content of rare earths.

Means for Solving the Problem(s)

As a result of the diligent study for solving the above problems, the inventor found that the problem can be solved by using a mixture of two specific catalysts.

Specifically, the invention provides a catalyst for hydrocarbon catalytic cracking described below.

(1) A catalyst for hydrocarbon catalytic cracking according to an aspect of the invention contains: a catalyst (a) containing faujasite-type zeolite (A) having a unit cell size in a range of 2.435 nm to 2.455 nm, a matrix component, and rare earths; and a catalyst (b) containing faujasite-type zeolite (B) having a unit cell size in a range of 2.445 nm to 2.462 nm, a matrix component, phosphorus, and magnesium.

(2) In the catalyst for hydrocarbon catalytic cracking according to the above aspect of the invention, a mixing mass ratio ((a)/(b)) of the catalyst (a) to the catalyst (b) is in a range of 10/90 to 90/10.

(3) In the catalyst for hydrocarbon catalytic cracking according to the above aspect of the invention, a content ($C_{ZA}$) of the faujasite-type zeolite (A) in the catalyst (a) is in a range of 10 mass % to 50 mass % in a form of a dry solid based on the catalyst (a).

(4) In the catalyst for hydrocarbon catalytic cracking according to the above aspect of the invention, a content ($C_{REA}$) of the rare earths in the catalyst (a) is in a range of 0.5 mass % to 5 mass % in terms of $RE_2O_3$ based on the catalyst (a).

(5) In the catalyst for hydrocarbon catalytic cracking according to the above aspect of the invention, a content ($C_{ZB}$) of the faujasite-type zeolite (B) in the catalyst (b) is in a range of 10 mass % to 50 mass % in terms of a dry solid based on the catalyst (b).

(6) In the catalyst for hydrocarbon catalytic cracking according to the above aspect of the invention, a content ($C_P$) of the phosphorous in the catalyst (b) is in a range of 0.1 mass % to 10 mass % in terms of $P_2O_5$ based on the catalyst (b).

(7) In the catalyst for hydrocarbon catalytic cracking according to the above aspect of the invention, a content ($C_M$) of the magnesium in the catalyst (b) is in a range of 0.05 mass % to 3 mass % in terms of MgO based on the catalyst (b).

(8) In the catalyst for hydrocarbon catalytic cracking according to the above aspect of the invention, a ratio ($C_P$)/($C_M$) between the content ($C_P$) of the phosphorous and the content ($C_M$) of the magnesium in the catalyst (b) is in a range of 0.1 to 8.

(9) In the catalyst for hydrocarbon catalytic cracking according to the above aspect of the invention, a ratio ($C_M$)/($C_{ZB}$) between the content ($C_M$) of the magnesium and the content ($C_{ZB}$) of the faujasite-type zeolite in the catalyst (b) is in a range of 0.001 to 0.1.

According to the above aspect of the invention, a catalyst for hydrocarbon catalytic cracking, which exhibits an excellent hydrothermal stability, a high residual oil (bottom) cracking ability and an excellent selectivity (a high liquid yield, a low gas and a low coke) even with a less content of a rare earth oxide can be provided.

DESCRIPTION OF EMBODIMENT(S)

A catalyst for hydrocarbon catalytic cracking in an exemplary embodiment of the invention (hereinafter, also simply referred to as "the present catalyst") is provided by blending: a catalyst (a) containing a predetermined faujasite-type zeolite (A), a matrix component, and rare earths; and a catalyst (b) containing a predetermined faujasite-type zeolite (B), a matrix component, phosphorus, and magnesium. The present catalyst will be specifically described below.

Catalyst (a)

A catalyst (a) of the present catalyst contains the predetermined faujasite-type zeolite (A), the matrix component, and the rare earths. The catalyst (a) itself also functions as a catalyst for hydrocarbon catalytic cracking. Each of the components of the catalyst (a) will be specifically described below.

Faujasite-Type Zeolite (A)

The faujasite-type zeolite has a skeleton including $SiO_2$ and $Al_2O_3$. A molar ratio ($M_S$)/($M_A$) between a mole number ($M_S$) of $SiO_2$ and a mole number ($M_A$) of $Al_2O_3$ in the skeleton is preferably in a range of 5 to 20, more preferably in a range of 6 to 15. When the molar ratio ($M_S$)/($M_A$) falls within this range, hydrothermal tolerance (i.e., a retention ratio of activity after a regeneration treatment at a high temperature) is further increased and activity and gasoline selectivity are also further increased.

When the molar ratio ($M_S$)/($M_A$) is low, the hydrothermal tolerance, activity and gasoline selectivity may be insufficient. In the fluid catalytic cracking process, carbonaceous deposits on the catalyst in a regeneration vessel are calcined for regeneration after the cracking reaction. However, since the temperature is raised by calcination heat while moisture is generated because the carbonaceous deposits contain hydrogen, the hydrothermal treatment is consequently performed at the high temperature. In this treatment, it is well known that crystallinity of zeolite is lowered.

On the other hand, when the molar ratio ($M_S$)/($M_A$) is excessively high, the hydrothermal tolerance is high, but the number of active sites is decreased, which may cause the activity to be insufficient.

A unit cell size of the faujasite-type zeolite (A) is in a range of 2.435 to 2.455 nm, preferably in a range of 2.440 to 2.450 nm. When the unit cell size falls within the above range, gasoline selectivity becomes significantly high. When the unit cell size is excessively low, the activity may be insufficient. On the other hand, when the unit cell size is excessively high, the hydrothermal tolerance and the metal tolerance may be insufficient.

The above unit cell size is obtained by measuring a surface distance between diffraction surfaces (553) and (642) of zeolite based on anatase-type $TiO_2$ as a reference material by X-ray diffraction method.

As the faujasite-type zeolite (A), $NH_4Y$ zeolite provided by ion-exchanging NaY-type zeolite with $NH_4$ ions is suitably usable. Ultrastable zeolite (USY) obtained by performing a hydrothermal treatment on $NH_4Y$ zeolite is particularly suitable.

Ultrastable zeolite (USY) can be manufactured by a well-known method. For instance, Procedure A and Procedure B described in "ZEOLITES AND CLAY MINERALS as Sorbents and Molecular Sieves" p. 350 (1975) by R. M. Barrer are suitably employable.

Specifically, in the Procedure B, NaY is ion-exchanged with ammonium chloride to provide $NH_4(0.75$ to $0.90)Na$ $(0.25$ to $0.10)$-Y. The obtained substance is washed, heated at 200 to 600 degrees C., and again ion-exchanged to remove residual Na+, thereby being brought into a metastable condition. Next, the obtained substance is rapidly heated at 600 to 800 degrees C. under steam atmosphere, so that zeolite having a unit cell size decreased by 1 to 1.5% is obtained.

Further, zeolite obtained by performing an acid treatment on the obtained ultrastable zeolite (USY) is also suitably usable.

A content ($C_{ZA}$) of the faujasite-type zeolite (A) in the catalyst (a) is in a range of 10 to 50 mass % in terms of a dry solid (mainly $SiO_2$ and $Al_2O_3$), further preferably in a range of 15 to 40 mass %.

When the dry solid content of the faujasite-type zeolite (A) is less than 10 mass %, the activity may be insufficient due to a small amount of zeolite.

When the content of the faujasite-type zeolite exceeds 50 mass % in terms of a dry solid, the activity may be excessively high to cause over-cracking, thereby occasionally lowering the selectivity. Moreover, since a content of a matrix component other than zeolite is decreased, wear resistance becomes insufficient. When such a faujasite-type zeolite is used as a fluidized catalyst, the fluidized catalyst may be easily pulverized and scattered. Although the content of the catalyst can be increased in order to prevent the above problem, the increase in the content of the catalyst is not economical.

Matrix Component

In the catalyst (a), the matrix component means a component other than the faujasite-type zeolite (A). As the matrix component, conventionally well-known inorganic oxide and inorganic compound (e.g., silica, alumina, silica-alumina and aluminum phosphate) are usable. The matrix component includes compounds referred to as a binding material and a filler.

Specifically, conventionally well-known inorganic oxide and inorganic compound derived from silica gel, silica sol, silica hydrosol, alumina gel, alumina sol, silica-alumina gel, silica-alumina sol, aluminum phosphate and the like are usable. Among the above, silica sol, silica hydrosol, alumina sol, silica-alumina sol, aluminum phosphate and the like are suitably usable because of serving also as a carrier (base material) or a binding material of the faujasite-type zeolite to provide a hydrocarbon catalytic cracking catalyst excellent in residual-oil cracking activity, metal tolerance and the like in addition to the activity, wear resistance and the like.

Air-calcined alumina powders used in JP-A-60-193543 (Patent Literature 4) are also suitably usable as alumina, Activated alumina is also usable. The activated alumina may be bonded with a silica component to contribute to the activity.

The catalyst (a) preferably contains alumina in a range of 1 to 30 mass % in terms of a dry solid ($Al_2O_3$), further preferably in a range of 2 to 20 mass %.

When the catalyst (a) contains alumina within the above range, an improvement in gasoline selectivity is large and residual-oil cracking activity and metal tolerance are excellent.

Further, in the catalyst (a), conventionally well-known clay minerals and the like such as kaoline, metakaoline, hydrotalcite and montmorillonite are usable as a filler. These clay minerals have no activity and serve as a bulking agent.

The catalyst (a) contains the matrix component in a range of 50 to 90 mass % in terms of a dry solid, further preferably in a range of 60 to 85 mass %.

When the dry solid content of the matrix component is low, the ratio of the faujasite-type zeolite (A) is excessively high, so that a bulk density may be excessively low although the activity is high or wear resistance, fluidity and the like may be insufficient. Such a catalyst is not practically usable for hydrocarbon catalytic cracking, particularly for hydrocarbon fluid catalytic cracking.

On the other hand, also when the dry solid content of the matrix component is excessively high, the ratio of the faujasite-type zeolite (A) (main active component) is low, which may cause an insufficient cracking activity.

Rare Earths

The catalyst (a) further contains rare earths as a component. A content ($C_{REA}$) of the rare earths is preferably in a range of 0.5 to 5 mass % in terms of $RE_2O_3$ based on the catalyst (a), further preferably in a range of 1.0 to 3.0 mass %. By containing the rare earths, a catalyst excellent in cracking activity and selectivity (e.g., gasoline selectivity) can be provided.

Examples of the rare earths include rare earth metals such as lanthanum, cerium and neodymium, and mixtures thereof. Typically, mixed rare earths containing lanthanum and cerium as the main components are used.

When a content of the rare earths is low, the cracking activity, selectivity, hydrothermal tolerance, metal tolerance and the like may become insufficient. However, the present catalyst exhibits sufficient effects even with a small amount of the rare earths as compared with a content of a conventional hydrocarbon catalytic cracking catalyst.

Also when the content of the rare earths is excessively high, it is difficult to support the rare earths by the method of the invention. Even if the rare earths can be supported, the effects obtained by supporting the rare earths, namely, cracking activity, selectivity, hydrothermal tolerance, metal tolerance and the like are not further improved and a support efficiency of the rare earths is unfavorably significantly decreased.

A mean particle diameter of the catalyst (a) is preferably in a range of 40 to 100 μm in terms of inventive effects, further preferably in a range of 50 to 80 μm.

Catalyst (b)

A catalyst (b) of the present catalyst contains the predetermined faujasite-type zeolite (B), the matrix component, phosphorus and magnesium. The catalyst (b) itself also functions as a hydrocarbon catalytic cracking catalyst. Each of the components of the catalyst (b) will be specifically described below.

Faujasite-Type Zeolite (B)

A unit cell size of the faujasite-type zeolite (B) of the catalyst (b) is in a range of 2.445 to 2.462 nm. The unit cell size is preferably in a range of 2.447 to 2.460 nm. When the unit cell size falls within the above range, gasoline selectivity becomes significantly high. When the unit cell size is excessively low, the activity may be insufficient. On the other hand, when the unit cell size is excessively high, the hydrothermal tolerance and the metal tolerance may be insufficient.

Other suitable structure and the like of the faujasite-type zeolite (B) of the catalyst (b) are the same as those of the faujasite-type zeolite (A) of the catalyst (a).

A content ($C_{ZB}$) of the faujasite-type zeolite (B) in the catalyst (b) is in a range of 10 to 50 mass % in terms of a dry solid (mainly $SiO_2$ and $Al_2O_3$), further preferably in a range of 15 to 40 mass %.

When the dry solid content of the faujasite-type zeolite (B) is less than 10 mass %, the activity may be insufficient due to a small amount of zeolite.

When the dry solid content of the faujasite-type zeolite (B) exceeds 50 mass %, the activity may be excessively high to cause over-cracking, thereby occasionally lowering the selectivity. Moreover, since a content of a matrix component other than zeolite is decreased, wear resistance becomes insufficient. When such a faujasite-type zeolite is used in a fluidized catalyst, the fluidized catalyst may be easily pulverized and scattered. Although the content of the catalyst can be increased in order to prevent the above problem, the increase in the content of the catalyst is not economical.

Matrix Component

The same matrix component as in the faujasite-type zeolite of the catalyst (a) is suitably used as a matrix component of the catalyst (b).

The content ($C_{ZB}$) of the matrix component in the catalyst (b) in terms of a dry solid is in a range of 50 to 90 mass % based on the catalyst (b), further preferably in a range of 60 to 85 mass %.

When the dry solid content of the matrix component is low, the faujasite-type zeolite is excessively increased, so that a bulk density may be excessively low although the activity is high or wear resistance, fluidity and the like may be insufficient. Such a catalyst is not practically usable for hydrocarbon catalytic cracking, particularly for fluid catalytic cracking. Also when the dry solid content of the faujasite-type zeolite is excessively high, the content of the faujasite-type zeolite (main active component) may become low, which may cause an insufficient cracking activity.

The catalyst (b) preferably contains alumina as the matrix component in a range of 1 to 30 mass % in terms of a dry solid ($Al_2O_3$), further preferably in a range of 2 to 20 mass %. When the catalyst contains alumina falling within the above range, with below-described magnesium component and phosphorous component, an improvement in gasoline selectivity is large and residual-oil cracking activity and metal tolerance are excellent.

The magnesium component and phosphorous component are used in the catalyst (b), thereby enhancing the cracking ability and gasoline selectivity of the catalyst (b).

Magnesium Component

The catalyst (b) preferably contains the magnesium component in a range of 0.05 to 3 mass % in terms of MgO, further preferably in a range of 0.1 to 2.5 mass %. The magnesium component is preferably contained in a form of an ion, oxide or hydroxide. Since the magnesium component is used in the catalyst (b), the cracking ability and gasoline selectivity of the catalyst (b) can be improved.

When the content of the magnesium component is low, though depending on the later-described phosphorus content, an improvement in the hydrothermal tolerance may become insufficient or the cracking activity and selectivity of the catalyst may be lowered. On the other hand, when the content of the magnesium component is excessively high, though depending on the type and content of the faujasite-type zeolite (B), the magnesium component may not be supported. Even when the magnesium component is supported, a support efficiency may be significantly lowered. Also depending on the later-described phosphorus content, the cracking activity, gasoline selectivity, hydrothermal tolerance and the like of the catalyst may become insufficient.

Phosphorous Component

The catalyst (b) contains the phosphorous component. A content ($C_P$) of the phosphorous component in terms of $P_2O_5$ is preferably in a range of 0.1 to 10 mass %, further preferably in a range of 0.2 to 5 mass %. The phosphorus component is preferably contained in a form of a phosphate ion or oxide. By containing the phosphorus component, the catalyst having excellent cracking activity, hydrothermal tolerance and metal tolerance is obtainable.

When the content of the phosphorus component is low, though depending on the magnesium content, the catalyst may exhibit insufficient cracking activity, selectivity, residual oil cracking activity, metal tolerance, hydrothermal tolerance and the like.

On the other hand, when the content of the phosphorus component is excessively high, the cracking activity, selectivity, residual oil cracking activity, metal tolerance, hydrothermal tolerance and the like of the catalyst may be lowered. This is, although not apparently, because the excessive amount of the phosphorous component may lower crystallinity of the faujasite-type zeolite (B) and block pores of the catalyst.

Particularly, since the phosphorus component and the magnesium component are used together in the catalyst (b), the cracking activity, selectivity, residual oil cracking activity, metal tolerance, hydrothermal tolerance and the like of the catalyst (b) can be further improved.

When the content ($C_P$) of the phosphorus component exceeds 10 mass % in terms of $P_2O_5$, the cracking activity, selectivity, residual oil cracking activity, metal tolerance, hydrothermal tolerance and the like of the hydrocarbon catalytic cracking catalyst may be lowered, though depending on the content of the faujasite-type zeolite (B), the alumina content (the matrix component) and the content of the magnesium component.

A ratio ($C_P$)/($C_M$) of the content ($C_P$) of the phosphorous component to the content ($C_M$) of the magnesium component, which is a mass ratio between the components in terms of oxides, is preferably in a range of 0.1 to 8, more preferably in a range of 0.2 to 5.

It should be noted that the catalyst (b) may further contain a rare earth component. A content of the rare earth component is preferably in a range of 0.1 to 2 mass % in terms of $RE_2O_3$, further preferably in a range of 0.2 to 1.5 mass %. By containing the rare earth component, a catalyst having excellent cracking activity and selectivity of gasoline and the like is obtainable.

A mean particle diameter of the catalyst (b) is preferably in a range of 40 to 100 μm in view of inventive effects, further preferably in a range of 50 to 80 μm.

Manufacturing Method of Present Catalyst

The hydrocarbon catalytic cracking catalyst in the above exemplary embodiment of the invention can be manufactured by mixing the aforementioned catalysts (a) and (b). Known methods are employable as a mixing method of these catalysts.

A mixing mass ratio ((a)/(b)) of the catalyst (a) to the catalyst (b) is preferably in a range of 10/90 to 90/10, more preferably in a range of 30/70 to 90/10. When the mixing mass ratio of the catalyst (a) to the catalyst (b) falls within the above range, the advantages of the invention can be more strongly exhibited. Particularly, the mixing mass ratio within the above range is preferable since the amount of the rare earths to be used can be reduced.

Although the present catalyst is provided by mixing the aforementioned two specific catalysts, another component may be mixed in the present catalyst as long as an advantage of the invention is not hampered.

Since the catalyst (a) and the catalyst (b) can be manufactured by the same method, a manufacturing method of the catalyst (b) will be described below as an example.

The catalyst (b) can be suitably manufactured by the following steps (a) to (f). However, the step (d) may be omitted since the catalyst (b) does not require the rare earths as an essential component.

Step (a) in which a mixture slurry of faujasite-type zeolite and a matrix-forming component are spray-dried in a hot air stream to provide spherical microparticles Step (b) in which the spherical microparticles are washed Step (c) for magnesium ion exchange Step (d) for rare earth ion exchange Step (e) for contact with phosphate ions Step (f) for drying Step (a)

A mixture slurry of faujasite-type zeolite and a matrix-forming component are spray-dried in a hot air stream to provide spherical microparticles.

An ultrastable zeolite is suitably usable as the faujasite-type zeolite. As the matrix-forming component, the aforementioned matrix component or a compound to be a matrix component after serving as a catalyst are suitably usable, examples of the compound including silica gel, silica sol, alumina gel, alumina sol, silica-alumina gel, silica-alumina sol and aluminum phosphate.

The mixture slurry may contain the aforementioned bulking agent.

The concentration of the mixture slurry is not particularly limited as long as the catalyst for catalytic cracking has desired mean particle diameter, particle diameter distribution, wear resistance and the like. However, the concentration of the mixture slurry is preferably in a range of 10 to 50 mass %, further preferably in a range of 20 to 40 mass %. When the concentration of the mixture slurry falls within the above range, spray-drying of the mixture slurry is easy and adjustment to the desired particle diameter and particle size distribution is possible.

When the concentration of the mixture slurry is low, an evaporation moisture amount at the time of spray-drying is large and a large heat energy is required, thereby lowering the economic efficiency. Moreover, a catalyst having desired mean particle diameter and particle size distribution may be not obtainable, or a bulk density may be decreased to make the fluidity insufficient. Even when the concentration of the mixture slurry is excessively high, the density of the mixture slurry may become too high to make the spray-drying difficult, or a catalyst having desired mean particle diameter and particle size distribution may be not obtainable.

As the spray-drying method, any conventionally known methods are usable without any limitation as long as a catalyst for catalytic cracking having desired mean particle diameter, particle size distribution, wear resistance and the like is obtained. For instance, conventionally known methods such as rotary disc method, pressurized nozzle method, and two-fluid nozzle method are usable.

For the spray-drying, it is preferable that a temperature at an inlet of the hot air is approximately in a range of 250 to 500 degrees C. and a temperature at an outlet of the hot air is in a range of 150 to 250 degrees C.

In the invention, the mean particle diameter of the spherical microparticle is approximately in a range of 40 to 100 μm, further preferably in a range of 50 to 80 μm. For evaluation of the particle diameter, the particle diameter is measured according to dry micromesh sieve method and a value at 50 mass % is defined as a mean particle diameter.

In the invention, the step (b) below is preferably performed subsequently to the step (a).

Step (b)

Next, the spherical microparticles are washed.

This washing is performed in order to remove catalyst poison such as alkali metal, $Cl^-$ and $SO_4^{2-}$ which may be contained in the faujasite-type zeolite or the matrix-forming component. The catalyst poison is preferably reduced as much as possible. The content of the alkali metal is preferably approximately 1 mass % or less in terms of an alkali metal oxide, further preferably 0.5 mass % or less. The content of anions such as $Cl^-$ and $SO_4^{2-}$ is preferably approximately 2 mass % or less, further preferably 1 mass % or less.

For washing, typically, water (preferably hot water) is poured. However, an aqueous solution of an ammonium salt (e.g., ammonium sulfate and ammonium chloride), a hot ammonia water and the like may be used.

Step (c)

Subsequently, Mg is introduced by magnesium ion exchange.

As a method of magnesium ion exchange, for instance, the washed spherical microparticles are contacted with an aqueous solution of a magnesium compound, or preferably, the washed spherical microparticles are dispersed in the aqueous solution of the magnesium compound.

Examples of the magnesium compound include magnesium chloride, magnesium nitrate, and magnesium sulfate. The magnesium compound is used so that the magnesium content ($C_M$) in the obtained hydrocarbon catalytic cracking catalyst is in a range of 0.05 to 3 mass % in terms of MgO, further in a range of 0.1 to 2.5 mass %.

Moreover, the magnesium compound is preferably used so that a ratio $(C_M)/(C_{ZB})$ of the magnesium content ($C_M$) to the content ($C_{ZB}$) of the faujasite-type zeolite (B) in the obtained hydrocarbon catalytic cracking catalyst is preferably in a range of 0.001 to 0.1, further preferably in a range of 0.002 to 0.08.

When the ratio $(C_M)/(C_{ZB})$ is excessively low, an improvement in the hydrothermal stability, cracking activity, selectivity and the like of the hydrocarbon catalytic cracking catalyst may be insufficient.

When the ratio $(C_M)/(C_{ZB})$ is excessively high, it is difficult to support magnesium on zeolite. Even if magnesium is supported, a further improvement in the hydrothermal stability, cracking activity, selectivity and the like of the hydrocarbon catalytic cracking catalyst is not made. Depending on the content of the phosphorous component, the hydrothermal stability may become insufficient.

pH of a dispersion liquid provided by dispersing the spherical microparticles in the aqueous solution of the magnesium compound is preferably in a range of 3 to 8, further preferably in a range of 4 to 7.5. For adjustment of pH, typically, ammonia water is used for increasing pH while an acid aqueous solution such as sulfuric acid, hydrochloric acid and nitric acid is used for decreasing pH.

At a low pH of the dispersion liquid provided by dispersing the spherical microparticles in the aqueous solution of the magnesium compound, depending on types of the faujasite-type zeolite, crystallinity may be lowered to make the cracking activity insufficient. Moreover, when alumina is contained as the matrix-forming component, alumina may be eluted to hamper advantages to be obtained by using alumina, promotion of supporting phosphorous, and advantages of supporting phosphorous.

Even at an excessively high pH of the dispersion liquid provided by dispersing the spherical microparticles in the aqueous solution of the magnesium compound, the amount of the supported magnesium component may be insufficient, or alkali ($Na_2O$) may not be further reduced. Furthermore, when the matrix component (e.g., silica sol) is used, wear resistance of the obtained hydrocarbon catalytic cracking catalyst may be insufficient.

The step (d) below may be performed prior to or subsequent to the step (c).

Step (d)

Subsequently, rare earths (RE) are introduced by rare earth ion exchange as needed.

Prior to the rare earth ion exchange, it is preferable to remove anions contained in the magnesium compound and residual magnesium ions when excessive magnesium ions are present, by pouring water or hot water.

As a method of the rare earth ion exchange, for instance, the spherical microparticles after the magnesium ion exchange are contacted with an aqueous solution of a rare earth compound, or preferably, the spherical microparticles after the magnesium ion exchange are dispersed in the aqueous solution of the rare earth compound.

The rare earth compound is preferably used so that a content ($C_{REB}$) of the rare earths in the obtained catalyst (b) is in a range of 0.1 to 2 mass % in terms of $RE_2O_3$, further preferably in a range of 0.2 to 1.5 mass %.

pH of a dispersion liquid for the rare earth (RE) ion exchange is preferably in a range of 4 to 6, further preferably in a range of 4.5 to 5.5.

pH of the dispersion liquid for the rare earth ion exchange is less than 4 when the rare earth ion exchange is insufficiently performed or when the magnesium ions previously supported may be partially separated.

At pH of more than 6 of the dispersion liquid for the rare earth ion exchange, the rare earth ions may become a hydroxide and be deposited on the catalyst without ion exchange with zeolite, so that the cracking activity, selectivity, hydrothermal tolerance, metal tolerance and the like may not be improved.

After the rare earth ion exchange, it is preferable to remove anions contained in the rare earth compound by pouring water or hot water.

Step (e)

Subsequently, phosphorus is introduced to the microparticles by contact with phosphate ions.

Examples of the phosphate compound to be used for introducing the phosphate ions include orthophosphoric acid, triammonium orthophosphate, diammonium hydrogen orthophosphate, diammonium hydrogen orthophosphate, pyrophosphoric acid, ammonium pyrophosphate, and diammonium dihydrogen pyrophosphate.

Among the above, orthophosphoric acid and pyrophosphoric acid can be efficiently introduced. At the same time, the obtained hydrocarbon catalytic cracking catalyst has excellent cracking activity, selectivity, residual oil cracking activity, metal tolerance, hydrothermal tolerance and the like.

Phosphorous is introduced by adding the phosphate compound to the dispersion liquid of the spherical microparticles in which magnesium is introduced or the rare earths is further introduced as needed.

The phosphate compound is preferably used so that the content ($C_P$) of the phosphoric acid in the obtained hydrocarbon catalytic cracking catalyst is in a range of 0.1 to 10 mass % in terms of $P_2O_5$, further preferably in a range of 0.2 to 8 mass %.

When the content ($C_P$) of the phosphoric acid is less than 0.1 mass % in terms of $P_2O_5$, the cracking activity, selectivity, residual oil cracking activity, metal tolerance, and hydrothermal tolerance of the obtained hydrocarbon catalytic cracking catalyst may not be sufficiently improved.

When the content ($C_P$) of the phosphoric acid exceeds 10 mass % in terms of $P_2O_5$, the cracking activity, selectivity, residual oil cracking activity, metal tolerance, hydrothermal tolerance and the like of the hydrocarbon catalytic cracking catalyst may be lowered depending on the content of the faujasite-type zeolite, the alumina content (the matrix component) and the content of the magnesium component.

A ratio ($C_P$)/($C_M$) (the content ($C_P$) of the phosphoric acid to the content ($C_M$) of the magnesium component) is preferably in a range of 0.1 to 8, more preferably in a range of 0.2 to 5.

When the ratio ($C_P$)/($C_M$) is out of the above range, advantages by using the phosphoric acid and the magnesium content in combination, specifically, a sufficient improvement in the cracking activity, selectivity, residual oil cracking activity, metal tolerance, hydrothermal tolerance and the like may not be obtained.

pH of the spherical microparticle dispersion liquid when contacted with the phosphoric acid ions is not particularly limited as long as the above predetermined amount of the phosphoric acid can be introduced, but is preferably approximately in a range of 2 to 6, further preferably in a range of 3 to 5, though depending on types of the phosphate compound.

At a low pH of the spherical microparticle dispersion liquid when introducing phosphorous, acidity is strong to lower crystallinity of zeolite contained in the spherical microparticles, thereby possibly reducing the cracking activity and selectivity. Even at a high pH, dispersibility of the phosphorous component may be lowered and an improvement in the hydrothermal tolerance may become insufficient.

Step (f)

Next, the spherical microparticle dispersion liquid is filtrated to separate and dry the spherical microparticles.

A drying method is not particularly limited and any conventionally drying method is usable as long as the spherical microparticles are dried so that moisture therein is approximately 8 to 15 mass %.

For instance, a rotary dryer (rotary kiln) is suitably usable for industrial mass production.

In the thus obtained hydrocarbon catalytic cracking catalyst, the content ($C_{ZB}$) of the faujasite-type zeolite is in a range of 10 to 50 mass % in terms of a dry solid, the content ($C_P$) of phosphorous is in a range of 0.1 to 10 mass % in terms of $P_2O_5$, and the content ($C_M$) of magnesium is in a range of 0.05 to 3 mass % in terms of MgO.

Further, when the present catalyst is used as a catalyst for fluid catalytic cracking, the mean particle diameter of the catalyst (b) is preferably in a range of 40 to 80 μm. It is only required to adjust the mean particle diameter to a predetermined range defined in Step (a) in which the microparticles are prepared. For instance, the particle diameter is adjustable by adjusting as needed a viscosity of the dispersion liquid, nozzle system, spray amount and the like.

The same as in the above steps and preferable arrangements (e.g., mean particle diameter) applies to the catalyst (a).

Manufacturing Method of Various Parameters

Mass Analysis Method of Elements

Mass analysis of elements was chemically conducted using an inductively-coupled plasma spectrometer. Specifically, samples were dissolved in concentrated hydrochloric acid and adjusted with water to provide solutions having a concentration of 1 to 100 mass ppm of the samples. The solutions were analyzed using SPS-5520 manufactured by SII.

Measuring Method of X-Ray Diffraction

Qualitative analysis of the samples by X-ray diffraction was conducted using X-RAY DIFFRACT METER (RINT 1400) manufactured by Rigaku Corporation. Specifically, after the sample was pulverized and molded, the sample was set in the device and measured at a tube voltage of 30.0 kV, a tube current of 130.0 mA, an anticathode of Cu, a measurement range from a starting angle (10.000 degrees) to an end angle (70.000 degrees) (2θ), a scan speed of 2.000 degrees/min, a divergence slit of 1 deg, a scattering slit of 1 deg, and a receiving slit of 0.15 mm.

Measuring Method of Mean Particle Diameter

A particle size distribution of the sample was measured using a laser diffraction/scattering type particle size distribution measuring device (LA-300) manufactured by HORIBA, Ltd. Specifically, the sample was put in a solvent (water) so that a light transmissivity was in a range of 70 to 95% and measured at a circulation rate of 2.8 L/min, ultrasound operation for 3 min, and repetition of 30. A measurement value was expressed by a median diameter.

EXAMPLES

The invention will be described below in more details with reference to Examples and Comparatives, but is not limited to the Examples.

Tables 1-1 to 2-4 show manufacturing conditions of catalysts, properties of the obtained catalysts, and performance evaluation results of the catalysts in the following Examples and Comparatives. In Tables, the unit cell size of zeolite is expressed by a unit of angstrom.

Example 1

Mass Mixing Ratio (a)/(b)=67/33

Preparation of Faujasite-Type Zeolite a-(1) (Lattice Constant: 2.445 nm)

NaY zeolite of 1 kg (manufactured by JGC Catalysts and Chemicals Ltd.; $SiO_2/Al_2O_3$ molar ratio=5.2; unit cell size=2.467 nm) was dispersed in deionized water of 10 kg, and was heated to 60 degrees C. Ammonium sulfate of 2 molar equivalents relative to NaY zeolite was added for ion exchange for one hour. Subsequently, the obtained solution was filtrated, sufficiently washed with hot water, and dried at 130 degrees C. for 10 hours to prepare ammonium ion-exchanged zeolite powders (1). At this time, an $NH_4$ ion exchange ratio was 65 mass % and an Na ion residual ratio was 35 mass %. Hereinafter, this is represented by $NH_{4(65)}Na_{(35)}Y$.

Next, the ammonium ion-exchanged zeolite powders were calcined at 500 degrees C. for four hours to provide $H_{(65)}Na_{(35)}Y$ powders, The $H_{(65)}Na_{(35)}Y$ powders were again dispersed in 5 kg of ammonium sulfate aqueous solution having a concentration of 40 mass % and heated to 60 degrees C. pH of the obtained dispersion liquid was adjusted to 4.5 and ion exchange was conducted for eight hours. Subsequently, the obtained solution was sufficiently washed by pouring hot water, and dried at 150 degrees C. for 10 hours to prepare ammonium ion-exchanged zeolite powders (2). At this time, the $NH_4$ ion exchange ratio was 90 mass % and the Na ion residual ratio was 10 mass %. Hereinafter, this is represented by $NH_{4(90)}Na_{(10)}Y$.

Next, the ammonium ion-exchanged zeolite powders (2) were fed in a stainless container and heated at 760 degrees C. for one hour under saturated steam atmosphere in a rotary streaming device to prepare faujasite-type zeolite a-(1) (i.e., ultrastable zeolite).

An $SiO_2/Al_2O_3$ molar ratio, an $Na_2O$ content, a unit cell size, a specific surface area and the like of the obtained faujasite-type zeolite a-(1) were measured.

Preparation of Faujasite-Type Zeolite b-(1) (Lattice Constant: 2.455 nm)

The ammonium ion-exchanged zeolite powders (2), which were prepared in the same manner as for faujasite-type zeolite a-(1), were fed in a stainless container and heated at 700 degrees C. for one hour under saturated steam atmosphere in a rotary streaming device to prepare faujasite-type zeolite b-(1) (i.e., ultrastable zeolite).

An $SiO_2/Al_2O_3$ molar ratio, $Na_2O$ content, unit cell size, and specific surface area of the obtained faujasite-type zeolite b-(1) were measured.

Preparation of Hydrocarbon Catalytic Cracking Catalyst a-(1)

Commercially available No. 3 water glass (sodium silicate aqueous solution) and sulfuric acid were rapidly mixed with stirring to prepare silica hydrosol having a concentration of 12.5 mass % in terms of $SiO_2$. To the prepared silica hydrosol of 4000 g, kaolin of 1125 g (on a dry basis), activated alumina of 125 g (on a dry basis), and faujasite-type zeolite a-(1) of 750 g (on a dry basis) were added to prepare a mixture slurry a-(1) having a dry solid concentration of 30 mass %.

Next, the mixture slurry a-(1) having a dry solid concentration of 30 mass % was sprayed into a hot air stream having an inlet temperature of 250 degrees C. to prepare spherical microparticles a-(1). At this time, a mean particle diameter of the spherical microparticles a-(1) was 65 μm. An outlet temperature of the hot air was 150 degrees C.

Subsequently, the obtained spherical microparticles a-(1) of 2000 g by dry mass were suspended in hot water of 10 kg that was five times as much as the spherical microparticles a-(1). Ammonium sulfate of 203 g, which was the same molar amount as that of alumina supported on faujasite-type zeolite a-(1) contained in the spherical microparticles a-(1), was added to the obtained suspension. The obtained solution was dehydrated and washed by pouring water.

Next, the washed spherical microparticles a-(1) were suspended in hot water of 10 kg, to which a rare earth chloride aqueous solution of 200 g having a concentration of 20 mass % in terms of $RE_2O_3$ was added. Ion exchange was conducted at 60 degrees C. for 30 minutes. After the ion exchange, the obtained solution was dehydrated and washed by pouring water.

Next, the spherical microparticles a-(1) supporting the rare earth component and washed were dried in a dryer at 150 degrees C. for two hours to prepare a hydrocarbon catalytic cracking catalyst a-(1).

An $RE_2O_3$ content and a mean particle diameter of the obtained hydrocarbon catalytic cracking catalyst a-(1) were measured.

Preparation of Hydrocarbon Catalytic Cracking Catalyst b-(1)

Commercially available No. 3 water glass (sodium silicate aqueous solution) and sulfuric acid were rapidly mixed with stirring to prepare silica hydrosol having a concentration of 12.5 mass % in terms of $SiO_2$. To the prepared silica hydrosol of 4000 g, kaolin of 1125 g (on a dry basis), activated alumina of 125 g (on a dry basis), and faujasite-type zeolite b-(1) of 750 g (on a dry basis) were added to prepare a mixture slurry b-(1) having a dry solid concentration of 30%.

Next, the mixture slurry b-(1) having a dry solid concentration of 30% was sprayed into a hot air stream having an inlet temperature of 250 degrees C. to prepare spherical microparticles (1). At this time, a mean particle diameter of the spherical microparticles b-(1) was 65 μm. An outlet temperature of the hot air was 150 degrees C.

Subsequently, the obtained spherical microparticles b-(1) 2000 g by dry mass were suspended in hot water of 10 kg that was five times as much as the spherical microparticles b-(1). Ammonium sulfate of 203 g, which was the same molar amount as that of alumina supported on faujasite-type zeolite b-(1) contained in the spherical microparticles b-(1), was added to the obtained suspension. The obtained solution was dehydrated and washed by pouring water.

Next, the washed spherical microparticles b-(1) were suspended in hot water of 10 kg, to which a magnesium chloride aqueous solution of 200 g having a concentration of 10 mass % in terms of MgO was added. Ion exchange was conducted at 60 degrees C. for 30 minutes. At this time, ammonia water having a concentration of 15 mass % was added to the obtained solution so that pH of the solution became 5.5. Subsequently, the solution was dehydrated and washed by pouring water.

Next, the microparticles b-(1) after magnesium ion exchange were suspended in hot water of 10 kg, to which a $H_3PO_4$ aqueous solution of 14.1 g having a concentration of 85 mass % in terms of $P_2O_5$ was added. At this time, the obtained solution was adjusted to have pH of 4. Subsequently, the solution was dehydrated and washed by pouring water.

Next, the washed spherical microparticles (1) supporting the magnesium and phosphorous components were dried in a dryer at 150 degrees C. for two hours to prepare a hydrocarbon catalytic cracking catalyst b-(1).

MgO and $P_2O_5$ contents and a mean particle diameter of the obtained hydrocarbon catalytic cracking catalyst b-(1) were measured.

Preparation and Evaluation of Hydrocarbon Catalytic Cracking Catalyst (1)-1

The above hydrocarbon catalytic cracking catalysts a-(1) and b-(1) were mixed at a mass ratio of 2:1 on a dry basis to prepare a hydrocarbon catalytic cracking catalyst (1)-1.

Performance Test

The hydrocarbon catalytic cracking catalyst (1)-1 was brought into a quasi-equilibrium state and evaluated in terms of catalyst performance (cracking performance).

Quasi Equilibrium

After being calcined at 600 degrees C. for one hour, the hydrocarbon catalytic cracking catalyst (1)-1 absorbed a toluene solution in which nickel naphthenate and vanadium naphthenate were dissolved so that nickel was 2000 ppm and vanadium was 4000 ppm. Subsequently, after being dried at 110 degrees C., the hydrocarbon catalytic cracking catalyst (1)-1 was calcined at 600 degrees C. for 1.5 hours, steamed at 780 degrees C. for six hours, and again calcined at 600 degrees C. for one hour, resulting in a quasi equilibrium state.

Cracking Performance

A cracking reactor (manufactured by Kayser Technology, Inc.: ACE-MAT, Model R+) was used.

Material Oil: Desulfurized Atmospheric Residue
Catalyst/Material Oil Ratio (C/O): 5
Reaction Temperature: 520 degrees C.
Space Velocity: 8 $hr^{-1}$
Boiling Point Range of Gasoline: from 30 to 216 degrees C.
Boiling Point Range of Light Cycle Oil (LCO): from 216 to 343 degrees C.
Boiling Point Range of Heavy Cycle Oil (HCO): 343 degrees C. or more
Inversion Rate (mass %)=100−(LCO mass % +HCO mass %)(mass %)

Example 2

Mass Mixing Ratio (a)/(b)=90/10

Preparation and Evaluation of Hydrocarbon Catalytic Cracking Catalyst (1)-2

The hydrocarbon catalytic cracking catalysts a-(1) and b-(1) in Example 1 were mixed at a mass ratio of 90:10 on a dry basis to prepare a hydrocarbon catalytic cracking catalyst (1)-2. A catalyst performance was evaluated under the conditions described in Example 1.

Example 3

Mass Mixing Ratio (a)/(b)=40/60

Preparation and Evaluation of Hydrocarbon Catalytic Cracking Catalyst (1)-3

The hydrocarbon catalytic cracking catalysts a-(1) and b-(1) in Example 1 were mixed at a mass ratio of 40:60 on a dry basis to prepare a hydrocarbon catalytic cracking catalyst (1)-3. A catalyst performance was evaluated under the conditions described in Example 1.

Example 4

A unit cell size of zeolite forming the catalyst (a) was determined as 2.440 nm.
Preparation of Faujasite-Type Zeolite a-(2)

The ammonium ion-exchanged zeolite powders (2) prepared in the same manner as in Example 1 were fed in a stainless container and heated at 780 degrees C. for one hour under saturated steam atmosphere in a rotary streaming device to prepare faujasite-type zeolite a-(2) (i.e., ultrastable zeolite).

An $SiO_2/Al_2O_3$ molar ratio, an $Na_2O$ content, a unit cell size, and a specific surface area of the obtained faujasite-type zeolite a-(2) were measured.

Preparation of Hydrocarbon Catalytic Cracking Catalyst a-(2)

A hydrocarbon catalytic cracking catalyst a-(2) was prepared in the same manner as in Example 1 except that the faujasite-type zeolite a-(1) was replaced by the faujasite-type zeolite a-(2).

An $RE_2O_3$ content and a mean particle diameter of the obtained hydrocarbon catalytic cracking catalyst a-(2) were measured.

Preparation and Evaluation of Hydrocarbon Catalytic Cracking Catalyst (2)-1

The hydrocarbon catalytic cracking catalysts a-(2) and b-(1) were mixed at a mass ratio of 2:1 on a dry basis to prepare a hydrocarbon catalytic cracking catalyst (2)-1. A catalyst performance was evaluated under the conditions described in Example 1.

Example 5

A unit cell size of zeolite forming the catalyst (a) was determined as 2.450 nm.

Preparation of Faujasite-Type Zeolite a-(3)

The ammonium ion-exchanged zeolite powders (2) prepared in the same manner as in Example 1 were fed in a stainless container and heated at 730 degrees C. for one hour under saturated steam atmosphere in a rotary streaming device to prepare faujasite-type zeolite a-(3) (i.e., ultrastable zeolite).

An $SiO_2/Al_2O_3$ molar ratio, an $Na_2O$ content, a unit cell size, and a specific surface area of the obtained faujasite-type zeolite a-(3) were measured.

Preparation of Hydrocarbon Catalytic Cracking Catalyst a-(3)

A hydrocarbon catalytic cracking catalyst a-(3) was prepared in the same manner as the hydrocarbon catalytic cracking catalyst a-(1) in Example 1 except that the faujasite-type zeolite a-(1) was replaced by the faujasite-type zeolite a-(3).

An $RE_2O_3$ content and a mean particle diameter of the obtained hydrocarbon catalytic cracking catalyst a-(3) were measured.

Preparation and Evaluation of Hydrocarbon Catalytic Cracking Catalyst (2)-2

The hydrocarbon catalytic cracking catalysts a-(3) and b-(1) were mixed at a mass ratio of 2:1 on a dry basis to prepare a hydrocarbon catalytic cracking catalyst (2)-2. A catalyst performance was evaluated under the conditions described in Example 1.

Example 6

A unit cell size of zeolite forming the catalyst (b) was determined as 2.447 nm.

Preparation of Faujasite-Type Zeolite b-(2)

The ammonium ion-exchanged zeolite powders (2) prepared in the same manner as in Example 1 were fed in a stainless container and heated at 750 degrees C. for one hour under saturated steam atmosphere in a rotary streaming device to prepare faujasite-type zeolite b-(2) (i.e., ultrastable zeolite).

An $SiO_2/Al_2O_3$ molar ratio, $Na_2O$ content, unit cell size, and specific surface area of the obtained faujasite-type zeolite b-(2) were measured.

Preparation of Hydrocarbon Catalytic Cracking Catalyst b-(2)

A hydrocarbon catalytic cracking catalyst b-(2) was prepared in the same manner as the hydrocarbon catalytic cracking catalyst b-(1) in Example 1 except that the faujasite-type zeolite b-(1) was replaced by the faujasite-type zeolite b-(2).

MgO and $P_2O_5$ contents and a mean particle diameter of the obtained hydrocarbon catalytic cracking catalyst b-(2) were measured.

Preparation and Evaluation of Hydrocarbon Catalytic Cracking Catalyst (3)-2

The hydrocarbon catalytic cracking catalysts a-(1) and b-(2) were mixed at a mass ratio of 2:1 on a dry basis to prepare a hydrocarbon catalytic cracking catalyst (3)-1. A catalyst performance was evaluated under the conditions described in Example 1.

Example 7

A unit cell size of zeolite forming the catalyst (b) was determined as 2.460 nm.

Preparation of Faujasite-Type Zeolite b-(3)

The ammonium ion-exchanged zeolite powders (2) prepared in the same manner as in Example 1 were fed in a stainless container and heated at 680 degrees C. for one hour under saturated steam atmosphere in a rotary streaming device to prepare faujasite-type zeolite b-(3) (i.e., ultrastable zeolite).

An $SiO_2/Al_2O_3$ molar ratio, $Na_2O$ content, unit cell size, and specific surface area of the obtained faujasite-type zeolite b-(3) were measured.

Preparation of Hydrocarbon Catalytic Cracking Catalyst b-(3)

A hydrocarbon catalytic cracking catalyst b-(3) was prepared in the same manner as the hydrocarbon catalytic cracking catalyst b-(1) in Example 1 except that the faujasite-type zeolite b-(1) was replaced by the faujasite-type zeolite b-(2).

MgO and $P_2O_5$ contents and a mean particle diameter of the obtained hydrocarbon catalytic cracking catalyst b-(3) were measured.

Preparation and Evaluation of Hydrocarbon Catalytic Cracking Catalyst (3)-2

The hydrocarbon catalytic cracking catalysts a-(1) and b-(3) were mixed at a mass ratio of 2:1 on a dry basis to prepare a hydrocarbon catalytic cracking catalyst (3)-2. A catalyst performance was evaluated under the conditions described in Example 1.

Example 8

In the catalyst (b), a mass ratio of matrix to zeolite was determined at a higher value.

Preparation of Hydrocarbon Catalytic Cracking Catalyst b-(4)

Commercially available No. 3 water glass (sodium silicate aqueous solution) and sulfuric acid were rapidly mixed with stirring to prepare silica hydrosol having a concentration of 12.5 mass % in terms of $SiO_2$. To the prepared silica hydrosol of 4000 g, kaolin of 1000 g (on a dry basis), activated alumina of 250 g (on a dry basis), and faujasite-type zeolite b-(1) of 750 g (on a dry basis) were added to prepare a mixture slurry b-(2) having a dry solid concentration of 30 mass %.

Next, the mixture slurry b-(2) having a dry solid concentration of 30 mass % was sprayed into a hot air stream having an inlet temperature of 250 degrees C. to prepare spherical microparticles b-(2). At this time, a mean particle diameter of the spherical microparticles b-(2) was 65 µm. An outlet temperature of the hot air was 150 degrees C.

Subsequently, the obtained spherical microparticles b-(2) of 2000 g by dry mass were suspended in hot water of 10 kg that was five times as much as the spherical microparticles b-(2). Ammonium sulfate of 203 g, which was the same molar amount as that of alumina supported on faujasite-type zeolite b-(1) contained in the spherical microparticles b-(2), was added to the obtained suspension. The obtained solution was dehydrated and washed by pouring water.

Next, the washed spherical microparticles b-(2) were suspended in hot water of 10 kg, to which a magnesium chloride aqueous solution of 200 g having a concentration of 10 mass % in terms of MgO was added. Ion exchange was conducted at 60 degrees C. for 30 minutes. At this time, ammonia water having a concentration of 15 mass % was added to the obtained solution so that pH of the solution became 5.5. Subsequently, the solution was dehydrated and washed by pouring water.

Next, the microparticles b-(2) after magnesium ion exchange were suspended in hot water of 10 kg, to which a $H_3PO_4$ aqueous solution of 14.1 g having a concentration of 85 mass % in terms of $P_2O_5$ was added. At this time, the obtained solution was adjusted to have pH of 4. Subsequently, the solution was dehydrated and washed by pouring water.

Next, the washed spherical microparticles b-(2) supporting the magnesium and phosphorous components were dried in a dryer at 150 degrees C. for two hours to prepare a hydrocarbon catalytic cracking catalyst b-(4).

MgO, $P_2O_5$ and $H_2O$ contents and a mean particle diameter of the obtained hydrocarbon catalytic cracking catalyst b-(4) were measured.

Preparation and Evaluation of Hydrocarbon Catalytic Cracking Catalyst (4)-1

The hydrocarbon catalytic cracking catalysts a-(1) and b-(4) were mixed at a mass ratio of 2:1 on a dry basis to prepare a hydrocarbon catalytic cracking catalyst (4)-1. A catalyst performance was evaluated under the conditions described in Example 1.

Example 9

In the catalyst (b), a mass ratio of matrix to zeolite was determined at a lower value.

Preparation of Hydrocarbon Catalytic Cracking Catalyst b-(5)

Commercially available No. 3 water glass (sodium silicate aqueous solution) and sulfuric acid were rapidly mixed with stirring to prepare silica hydrosol having a concentration of 12.5 mass % in tennis of $SiO_2$. To the prepared silica hydrosol of 4000 g, kaolin of 1200 g (on a dry basis), activated alumina of 50 g (on a dry basis), and faujasite-type zeolite b-(1) of 750 g (on a dry basis) were added to prepare a mixture slurry b-(3) having a dry solid concentration of 30%.

Next, the mixture slurry b-(3) having a dry solid concentration of 30 mass % was sprayed into a hot air stream having an inlet temperature of 250 degrees C. to prepare spherical microparticles b-(3). At this time, a mean particle diameter of the spherical microparticles b-(3) was 65 μm. An outlet temperature of the hot air was 150 degrees C.

Subsequently, the obtained spherical microparticles b-(3) of 2000 g by dry mass were suspended in hot water of 10 kg that was five times as much as the spherical microparticles b-(3). Ammonium sulfate of 203 g, which was the same molar amount as that of alumina supported on faujasite-type zeolite b-(1) contained in the spherical microparticles b-(3), was added to the obtained suspension. The obtained solution was dehydrated and washed by pouring water.

Next, the washed spherical microparticles b-(3) were suspended in hot water of 10 kg, to which a magnesium chloride aqueous solution of 200 g having a concentration of 10 mass % in terms of MgO was added. Ion exchange was conducted at 60 degrees C. for 30 minutes. At this time, ammonia water having a concentration of 15 mass % was added to the obtained solution so that pH of the solution became 5.5. Subsequently, the solution was dehydrated and washed by pouring water.

Next, the microparticles b-(3) after magnesium ion exchange were suspended in hot water of 10 kg, to which a $H_3PO_4$ aqueous solution of 14.1 g having a concentration of 85 mass % in terms of $P_2O_5$ was added. At this time, the obtained solution was adjusted to have pH of 4. Subsequently, the solution was dehydrated and washed by pouring water.

Next, the washed spherical microparticles b-(3) supporting the magnesium and phosphorous components were dried in a dryer at 150 degrees C. for two hours to prepare a hydrocarbon catalytic cracking catalyst b-(5).

MgO and $P_2O_5$ contents and a mean particle diameter of the obtained hydrocarbon catalytic cracking catalyst b-(5) were measured.

Preparation of Hydrocarbon Catalytic Cracking Catalyst (4)-2

The hydrocarbon catalytic cracking catalysts a-(1) and b-(5) were mixed at a mass ratio of 2:1 on a dry basis to prepare a hydrocarbon catalytic cracking catalyst (4)-2. A catalyst performance was evaluated under the conditions described in Example 1.

Comparative 1

Only the hydrocarbon catalytic cracking catalyst a-(1) described in Example 1 was used and evaluated in terms of a catalyst performance under the conditions described in Example 1.

Comparative 2

Only the hydrocarbon catalytic cracking catalyst a-(1) described in Example 1 was used. The amount of the rare earths to be supported was decreased.

Preparation and Evaluation of Hydrocarbon Catalytic Cracking Catalyst (R1)

A hydrocarbon catalytic cracking catalyst (R1) was prepared in the same manner as in Example 1 except that the amount of the rare earth chloride aqueous solution to be added was decreased so that the amount of the supported rare earth component in the hydrocarbon catalytic cracking catalyst a-(1) was 1.0% in terms of oxides.

The obtained hydrocarbon catalytic cracking catalyst (R1) was evaluated in terms of a catalyst performance under the conditions described in Example 1.

Comparative 3

Only the hydrocarbon catalytic cracking catalyst a-(1) described in Example 1 was used. The rare earth component was not supported.

Preparation and Evaluation of Hydrocarbon Catalytic Cracking Catalyst (R2)

A hydrocarbon catalytic cracking catalyst (R2) not supporting the rare earth component was prepared in the same manner as in Example 1 except that the step (d) for the hydrocarbon catalytic cracking catalyst a-(1) was omitted.

The obtained hydrocarbon catalytic cracking catalyst (R2) was evaluated in terms of a catalyst performance under the conditions described in Example 1.

Comparative 4

Only the hydrocarbon catalytic cracking catalyst b-(1) described in Example 1 was used and evaluated in terms of a catalyst performance under the conditions described in Example 1.

Comparative 5

A unit cell size of zeolite forming the catalyst (a) was determined as 2.432 nm.

Preparation of Faujasite-Type Zeolite a-(4)

The ammonium ion-exchanged zeolite powders (2) prepared in the same manner as in Example 1 were fed in a stainless container and heated at 800 degrees C. for one hour under saturated steam atmosphere in a rotary streaming device to prepare faujasite-type zeolite a-(4) (i.e., ultrastable zeolite).

An $SiO_2/Al_2O_3$ molar ratio, an $Na_2O$ content, a unit cell size, and a specific surface area of the obtained faujasite-type zeolite a-(4) were measured.

Preparation of Hydrocarbon Catalytic Cracking Catalyst a-(4)

A hydrocarbon catalytic cracking catalyst a-(3) was prepared in the same manner as in Example 1 except that the faujasite-type zeolite a-(1) was replaced by the faujasite-type zeolite a-(4).

An $RE_2O_3$ content and a mean particle diameter of the obtained hydrocarbon catalytic cracking catalyst a-(4) were measured.

Preparation and Evaluation of Hydrocarbon Catalytic Cracking Catalyst (R3)

The obtained hydrocarbon catalytic cracking catalysts a-(4) and b-(1) were mixed at a mass ratio of 2:1 on a dry basis to prepare a hydrocarbon catalytic cracking catalyst (R3). A catalyst performance was evaluated under the conditions described in Example 1.

Comparative 6

A unit cell size of zeolite forming the catalyst (a) was determined as 2.460 nm.

Preparation of Hydrocarbon Catalytic Cracking Catalyst a-(5)

A hydrocarbon catalytic cracking catalyst a-(5) was prepared in the same manner as the hydrocarbon catalytic cracking catalyst a-(1) in Example 1 except that the faujasite-type zeolite a-(1) was replaced by the faujasite-type zeolite b-(2).

An $RE_2O_3$ content and a mean particle diameter of the obtained hydrocarbon catalytic cracking catalyst a-(5) were measured.

Preparation and Evaluation of Hydrocarbon Catalytic Cracking Catalyst (R4)

The hydrocarbon catalytic cracking catalysts a-(5) and b-(1) were mixed at a mass ratio of 2:1 on a dry basis to prepare a hydrocarbon catalytic cracking catalyst (R4). A catalyst performance was evaluated under the conditions described in Example 1.

Comparative 7

A unit cell size of zeolite forming the catalyst (b) was determined as 2.440 nm.

Preparation of Hydrocarbon Catalytic Cracking Catalyst b-(6)

A hydrocarbon catalytic cracking catalyst b-(6) was prepared in the same manner as the hydrocarbon catalytic cracking catalyst b-(1) in Example 1 except that the faujasite-type zeolite b-(1) was replaced by the faujasite-type zeolite a-(2).

MgO and $P_2O_5$ contents and a mean particle diameter of the obtained hydrocarbon catalytic cracking catalyst b-(6) were measured.

Preparation and Evaluation of Hydrocarbon Catalytic Cracking Catalyst (R5)

The hydrocarbon catalytic cracking catalysts a-(1) and b-(6) were mixed at a mass ratio of 2:1 on a dry basis to prepare a hydrocarbon catalytic cracking catalyst (R5). A catalyst performance was evaluated under the conditions described in Example 1.

Comparative 8

A unit cell size of zeolite forming the catalyst (b) was determined as 2.465 nm.

Preparation of Faujasite-Type Zeolite b-(4)

The ammonium ion-exchanged zeolite powders (2) prepared in the same manner as in Example 1 were fed in a stainless container and heated at 660 degrees C. for one hour under saturated steam atmosphere in a rotary streaming device to prepare faujasite-type zeolite b-(4) (i.e., ultrastable zeolite).

An $SiO_2/Al_2O_3$ molar ratio, $Na_2O$ content, unit cell size, and specific surface area of the obtained faujasite-type zeolite b-(4) were measured.

Preparation of Hydrocarbon Catalytic Cracking Catalyst b-(7)

A hydrocarbon catalytic cracking catalyst b-(7) was prepared in the same manner as the hydrocarbon catalytic cracking catalyst b-(1) in Example 1 except that the faujasite-type zeolite b-(1) was replaced by the faujasite-type zeolite b-(3).

MgO and $P_2O_5$ contents and a mean particle diameter of the obtained hydrocarbon catalytic cracking catalyst b-(7) were measured. Results are shown in Table 1.

Preparation and Evaluation of Hydrocarbon Catalytic Cracking Catalyst (R6)

The obtained hydrocarbon catalytic cracking catalysts a-(1) and b-(7) were mixed at a mass ratio of 2:1 on a dry basis to prepare a hydrocarbon catalytic cracking catalyst (R6). A catalyst performance was evaluated under the conditions described in Example 1.

TABLE 1-1

| | | Mixture slurry | | | | | | |
|---|---|---|---|---|---|---|---|---|
| | | | Faujasite-type zeolite | | | | | |
| | | Mixing Ratio mass % | Type | $SiO_2/Al_2O_3$ molar ratio | unit cell size Å | specific surface area m²/g | $Na_2O$ content mass % | concentration mass % |
| Example 1 | Catalyst a-(1) | 67 | zeolite a-(1) | USY | 5.1 | 24.45 | 700 | 4 | 9 |
| | Catalyst b-(1) | 33 | zeolite b-(1) | USY | 5.1 | 24.55 | 650 | 4 | 9 |
| Example 2 | Catalyst a-(1) | 90 | zeolite a-(1) | USY | 5.1 | 24.45 | 700 | 4 | 9 |
| | Catalyst b-(1) | 10 | zeolite b-(1) | USY | 5.1 | 24.55 | 650 | 4 | 9 |
| Example 3 | Catalyst a-(1) | 40 | zeolite a-(1) | USY | 5.1 | 24.45 | 700 | 4 | 9 |
| | Catalyst b-(1) | 60 | zeolite b-(1) | USY | 5.1 | 24.55 | 650 | 4 | 9 |
| Example 4 | Catalyst a-(2) | 67 | zeolite a-(2) | USY | 5.1 | 24.40 | 720 | 4 | 9 |
| | Catalyst b-(1) | 33 | zeolite b-(1) | USY | 5.1 | 24.55 | 650 | 4 | 9 |

TABLE 1-1-continued

| | | | | | | | | | |
|---|---|---|---|---|---|---|---|---|---|
| Example 5 | Catalyst a-(3) | 67 | zeolite a-(3) | USY | 5.1 | 24.50 | 650 | 4 | 9 |
| | Catalyst b-(1) | 33 | zeolite b-(1) | USY | 5.1 | 24.55 | 650 | 4 | 9 |
| Example 6 | Catalyst a-(1) | 67 | zeolite a-(1) | USY | 5.1 | 24.45 | 700 | 4 | 9 |
| | Catalyst b-(2) | 33 | zeolite b-(2) | USY | 5.1 | 24.47 | 700 | 4 | 9 |
| Example 7 | Catalyst a-(1) | 67 | zeolite a-(1) | USY | 5.1 | 24.45 | 700 | 4 | 9 |
| | Catalyst b-(3) | 33 | zeolite b-(3) | USY | 5.1 | 24.60 | 630 | 4 | 9 |
| Example 8 | Catalyst a-(1) | 67 | zeolite a-(1) | USY | 5.1 | 24.45 | 700 | 4 | 9 |
| | Catalyst b-(4) | 33 | zeolite b-(1) | USY | 5.1 | 24.55 | 650 | 4 | 9 |
| Example 9 | Catalyst a-(1) | 67 | zeolite a-(1) | USY | 5.1 | 24.45 | 700 | 4 | 9 |
| | Catalyst b-(5) | 33 | zeolite b-(1) | USY | 5.1 | 24.55 | 650 | 4 | 9 |

| | | Mixture slurry | | | | | |
|---|---|---|---|---|---|---|---|
| | | Matrix-forming component | | | | | |
| | | Binding material | | Filler (1) | | Filler (2) | |
| | | Type | concentration mass % | Type | concentration mass % | Type | concentration mass % |
| Example 1 | Catalyst a-(1) | silica hydrosol | 6 | kaolin | 13.5 | activated alumina | 1.5 |
| | Catalyst b-(1) | silica hydrosol | 6 | kaolin | 13.5 | activated alumina | 1.5 |
| Example 2 | Catalyst a-(1) | silica hydrosol | 6 | kaolin | 13.5 | activated alumina | 1.5 |
| | Catalyst b-(1) | silica hydrosol | 6 | kaolin | 13.5 | activated alumina | 1.5 |
| Example 3 | Catalyst a-(1) | silica hydrosol | 6 | kaolin | 13.5 | activated alumina | 1.5 |
| | Catalyst b-(1) | silica hydrosol | 6 | kaolin | 13.5 | activated alumina | 1.5 |
| Example 4 | Catalyst a-(2) | silica hydrosol | 6 | kaolin | 13.5 | activated alumina | 1.5 |
| | Catalyst b-(1) | silica hydrosol | 6 | kaolin | 13.5 | activated alumina | 1.5 |
| Example 5 | Catalyst a-(3) | silica hydrosol | 6 | kaolin | 13.5 | activated alumina | 1.5 |
| | Catalyst b-(1) | silica hydrosol | 6 | kaolin | 13.5 | activated alumina | 1.5 |
| Example 6 | Catalyst a-(1) | silica hydrosol | 6 | kaolin | 13.5 | activated alumina | 1.5 |
| | Catalyst b-(2) | silica hydrosol | 6 | kaolin | 13.5 | activated alumina | 1.5 |
| Example 7 | Catalyst a-(1) | silica hydrosol | 6 | kaolin | 13.5 | activated alumina | 1.5 |
| | Catalyst b-(3) | silica hydrosol | 6 | kaolin | 13.5 | activated alumina | 1.5 |
| Example 8 | Catalyst a-(1) | silica hydrosol | 6 | kaolin | 13.5 | activated alumina | 1.5 |
| | Catalyst b-(4) | silica hydrosol | 6 | kaolin | 12.0 | activated alumina | 3.0 |
| Example 9 | Catalyst a-(1) | silica hydrosol | 6 | kaolin | 13.5 | activated alumina | 1.5 |
| | Catalyst b-(5) | silica hydrosol | 6 | kaolin | 14.4 | activated alumina | 0.6 |

TABLE 1-2

Manufacturing of hydrocarbon catalytic cracking catalyst

|  |  | | Spray dry | | Supporting of rare earths | | |
|  |  | Mixing ratio mass % | Inlet temperature° C. | Outlet temperature° C. | Rare earth compound type | Used amount mass % | pH |
| --- | --- | --- | --- | --- | --- | --- | --- |
| Example 1 | Catalyst a-(1) | 67 | 250 | 150 | RECl₃ | 2 | 5.5 |
|  | Catalyst b-(1) | 33 | 250 | 150 | — | — | — |
| Example 2 | Catalyst a-(1) | 90 | 250 | 150 | RECl₃ | 2 | 5.5 |
|  | Catalyst b-(1) | 10 | 250 | 150 | — | — | — |
| Example 3 | Catalyst a-(1) | 40 | 250 | 150 | RECl₃ | 2 | 5.5 |
|  | Catalyst b-(1) | 60 | 250 | 150 | — | — | — |
| Example 4 | Catalyst a-(2) | 67 | 250 | 150 | RECl₃ | 2 | 5.5 |
|  | Catalyst b-(1) | 33 | 250 | 150 | — | — | — |
| Example 5 | Catalyst a-(3) | 67 | 250 | 150 | RECl₃ | 2 | 5.5 |
|  | Catalyst b-(1) | 33 | 250 | 150 | — | — | — |
| Example 6 | Catalyst a-(1) | 67 | 250 | 150 | RECl₃ | 2 | 5.5 |
|  | Catalyst b-(2) | 33 | 250 | 150 | — | — | — |
| Example 7 | Catalyst a-(1) | 67 | 250 | 150 | RECl₃ | 2 | 5.5 |
|  | Catalyst b-(3) | 33 | 250 | 150 | — | — | — |
| Example 8 | Catalyst a-(1) | 67 | 250 | 150 | RECl₃ | 2 | 5.5 |
|  | Catalyst b-(4) | 33 | 250 | 150 | — | — | — |
| Example 9 | Catalyst a-(1) | 67 | 250 | 150 | RECl₃ | 2 | 5.5 |
|  | Catalyst b-(5) | 33 | 250 | 150 | — | — | — |

Manufacturing of hydrocarbon catalytic cracking catalyst

|  |  | Supporting of magnesium oxide | | | Supporting of phosphorous oxide | | |
|  |  | Magnesium compound | | | Phosphorous Compound | | |
|  |  | type | Used amount mass % | pH | type | Used amount mass % | pH |
| --- | --- | --- | --- | --- | --- | --- | --- |
| Example 1 | Catalyst a-(1) | — | — | — | — | — | — |
|  | Catalyst b-(1) | MgCl2 | 1 | 5.5 | H₃PO₄ | 0.4 | 4 |
| Example 2 | Catalyst a-(1) | — | — | — | — | — | — |
|  | Catalyst b-(1) | MgCl2 | 1 | 5.5 | H₃PO₄ | 0.4 | 4 |
| Example 3 | Catalyst a-(1) | — | — | — | — | — | — |
|  | Catalyst b-(1) | MgCl2 | 1 | 5.5 | H₃PO₄ | 0.4 | 4 |
| Example 4 | Catalyst a-(2) | — | — | — | — | — | — |
|  | Catalyst b-(1) | MgCl2 | 1 | 5.5 | H₃PO₄ | 0.4 | 4 |
| Example 5 | Catalyst a-(3) | — | — | — | — | — | — |
|  | Catalyst b-(1) | MgCl2 | 1 | 5.5 | H₃PO₄ | 0.4 | 4 |
| Example 6 | Catalyst a-(1) | — | — | — | — | — | — |
|  | Catalyst b-(2) | MgCl2 | 1 | 5.5 | H₃PO₄ | 0.4 | 4 |
| Example 7 | Catalyst a-(1) | — | — | — | — | — | — |
|  | Catalyst b-(3) | MgCl2 | 1 | 5.5 | H₃PO₄ | 0.4 | 4 |
| Example 8 | Catalyst a-(1) | — | — | — | — | — | — |
|  | Catalyst b-(4) | MgCl2 | 1 | 5.5 | H₃PO₄ | 0.4 | 4 |
| Example 9 | Catalyst a-(1) | — | — | — | — | — | — |
|  | Catalyst b-(5) | MgCl2 | 1 | 5.5 | H₃PO₄ | 0.4 | 4 |

TABLE 1-3

Hydrocarbon catalytic cracking catalyst

|  |  | Mixing ratio mass % | Faujasite-type zeolite content mass % | Binding material content mass % | Filler (1) content mass % | Filler (2) content mass % | Matrix/Zeolite mass ratio | $RE_2O_3$ content mass % | MgO content mass % | $P_2O_5$ content mass % | $(C_M)/(C_Z)$ mass ratio | $(C_P)/(C_M)$ mass ratio | Mean particle diameter μm |
| --- | --- | --- | --- | --- | --- | --- | --- | --- | --- | --- | --- | --- | --- |
| Example 1 | Catalyst a-(1) | 67 | 29.4 | 19.6 | 44.1 | 4.9 | 0.17 | 2 | — | — | — | — | 65 |
|  | Catalyst b-(1) | 33 | 29.6 | 19.7 | 44.4 | 4.9 | 0.17 | — | 1 | 0.4 | 0.034 | 0.40 | 65 |
| Example 2 | Catalyst a-(1) | 90 | 29.4 | 19.6 | 44.1 | 4.9 | 0.17 | 2 | — | — | — | — | 65 |
|  | Catalyst b-(1) | 10 | 29.6 | 19.7 | 44.4 | 4.9 | 0.17 | — | 1 | 0.4 | 0.034 | 0.40 | 65 |
| Example 3 | Catalyst a-(1) | 40 | 29.4 | 19.6 | 44.1 | 4.9 | 0.17 | 2 | — | — | — | — | 65 |
|  | Catalyst b-(1) | 60 | 29.6 | 19.7 | 44.4 | 4.9 | 0.17 | — | 1 | 0.4 | 0.034 | 0.40 | 65 |

TABLE 1-3-continued

|  |  | Hydrocarbon catalytic cracking catalyst |  |  |  |  |  |  |  |  |  |  |
|---|---|---|---|---|---|---|---|---|---|---|---|---|
|  |  | Mixing ratio mass % | Faujasite-type zeolite content mass % | Binding material content mass % | Filler (1) content mass % | Filler (2) content mass % | Matrix/ Zeolite mass ratio | $RE_2O_3$ content mass % | MgO content mass % | $P_2O_5$ content mass % | $(C_M)/(C_Z)$ mass ratio | $(C_P)/(C_M)$ mass ratio | Mean particle diameter μm |
| Example 4 | Catalyst a-(2) | 67 | 29.4 | 19.6 | 44.1 | 4.9 | 0.17 | 2 | — | — | — | — | 65 |
|  | Catalyst b-(1) | 33 | 29.6 | 19.7 | 44.4 | 4.9 | 0.17 | — | 1 | 0.4 | 0.034 | 0.40 | 65 |
| Example 5 | Catalyst a-(3) | 67 | 29.4 | 19.6 | 44.1 | 4.9 | 0.17 | 2 | — | — | — | — | 65 |
|  | Catalyst b-(1) | 33 | 29.6 | 19.7 | 44.4 | 4.9 | 0.17 | — | 1 | 0.4 | 0.034 | 0.40 | 65 |
| Example 6 | Catalyst a-(1) | 67 | 29.4 | 19.6 | 44.1 | 4.9 | 0.17 | 2 | — | — | — | — | 65 |
|  | Catalyst b-(2) | 33 | 29.6 | 19.7 | 44.4 | 4.9 | 0.17 | — | 1 | 0.4 | 0.034 | 0.40 | 65 |
| Example 7 | Catalyst a-(1) | 67 | 29.4 | 19.6 | 44.1 | 4.9 | 0.17 | 2 | — | — | — | — | 65 |
|  | Catalyst b-(3) | 33 | 29.6 | 19.7 | 44.4 | 4.9 | 0.17 | — | 1 | 0.4 | 0.034 | 0.40 | 65 |
| Example 8 | Catalyst a-(1) | 67 | 29.4 | 19.6 | 44.1 | 4.9 | 0.17 | 2 | — | — | — | — | 65 |
|  | Catalyst b-(4) | 33 | 29.6 | 19.7 | 39.4 | 9.9 | 0.33 | — | 1 | 0.4 | 0.034 | 0.40 | 65 |
| Example 9 | Catalyst a-(1) | 67 | 29.4 | 19.6 | 44.1 | 4.9 | 0.17 | 2 | — | — | — | — | 65 |
|  | Catalyst b-(5) | 33 | 29.6 | 19.7 | 47.3 | 2.0 | 0.07 | — | 1 | 0.4 | 0.034 | 0.40 | 65 |

TABLE 1-4

|  |  |  | Activity |  |  |  |  |  |  |
|---|---|---|---|---|---|---|---|---|---|
|  |  | Mixing ratio mass % | Inversion rate mass % | $H_2$ mass % | LPG mass % | Gasoline mass % | LCO mass % | HCO mass % | Coke mass % |
| Example 1 | Catalyst a-(1) | 67 | 72.25 | 0.25 | 16.29 | 50.00 | 17.15 | 10.60 | 4.12 |
|  | Catalyst b-(1) | 33 |  |  |  |  |  |  |  |
| Example 2 | Catalyst a-(1) | 90 | 72.56 | 0.25 | 16.19 | 50.34 | 17.06 | 10.38 | 4.21 |
|  | Catalyst b-(1) | 10 |  |  |  |  |  |  |  |
| Example 3 | Catalyst a-(1) | 40 | 71.36 | 0.28 | 15.91 | 49.20 | 17.75 | 10.89 | 4.35 |
|  | Catalyst b-(1) | 60 |  |  |  |  |  |  |  |
| Example 4 | Catalyst a-(2) | 67 | 72.79 | 0.23 | 16.12 | 50.56 | 16.98 | 10.23 | 4.26 |
|  | Catalyst b-(1) | 33 |  |  |  |  |  |  |  |
| Example 5 | Catalyst a-(3) | 67 | 71.28 | 0.29 | 15.78 | 49.23 | 17.49 | 11.23 | 4.34 |
|  | Catalyst b-(1) | 33 |  |  |  |  |  |  |  |
| Example 6 | Catalyst a-(1) | 67 | 72.38 | 0.27 | 16.12 | 50.02 | 17.07 | 10.55 | 4.36 |
|  | Catalyst b-(2) | 33 |  |  |  |  |  |  |  |
| Example 7 | Catalyst a-(1) | 67 | 72.53 | 0.31 | 16.23 | 49.82 | 17.24 | 10.23 | 4.45 |
|  | Catalyst b-(3) | 33 |  |  |  |  |  |  |  |
| Example 8 | Catalyst a-(1) | 67 | 72.77 | 0.35 | 16.01 | 49.65 | 17.35 | 9.88 | 4.31 |
|  | Catalyst b-(4) | 33 |  |  |  |  |  |  |  |
| Example 9 | Catalyst a-(1) | 67 | 71.76 | 0.29 | 15.76 | 49.73 | 17.23 | 11.01 | 4.25 |
|  | Catalyst b-(5) | 33 |  |  |  |  |  |  |  |

TABLE 2-1

|  |  | Mixture slurry |  |  |  |  |  |  |
|---|---|---|---|---|---|---|---|---|
|  |  |  | Faujasite-type zeolite |  |  |  |  |  |
|  |  | Mixing ratio mass % | type | $SiO_2/Al_2O_3$ molar ratio | unit cell size Å | specific surface area $m^2/g$ | $Na_2O$ content mass % | concentration mass % |
| Comparative 1 | Catalyst a-(1) | 100 | Zeolite a-(1) | USY | 5.1 | 24.45 | 700 | 4 | 9 |
| Comparative 2 | Catalyst a-(1) | 100 | Zeolite a-(1) | USY | 5.1 | 24.45 | 700 | 4 | 9 |
| Comparative 3 | Catalyst a-(1) | 100 | Zeolite a-(1) | USY | 5.1 | 24.45 | 700 | 4 | 9 |
| Comparative 4 | — | — | — | — | — | — | — | — |
|  | Catalyst b-(1) | 100 | Zeolite b-(1) | USY | 5.1 | 24.55 | 650 | 4 | 9 |
| Comparative 5 | Catalyst a-(4) | 67 | Zeolite a-(4) | USY | 5.1 | 24.32 | 750 | 4 | 9 |

TABLE 2-1-continued

|  |  |  |  |  |  |  |  |  |  |
|---|---|---|---|---|---|---|---|---|---|
|  | Catalyst b-(1) | 33 | Zeolite b-(1) | USY | 5.1 | 24.55 | 650 | 4 | 9 |
| Comparative 6 | Catalyst a-(5) | 67 | Zeolite b-(3) | USY | 5.1 | 24.60 | 630 | 4 | 9 |
|  | Catalyst b-(1) | 33 | Zeolite b-(1) | USY | 5.1 | 24.55 | 650 | 4 | 9 |
| Comparative 7 | Catalyst a-(1) | 67 | Zeolite a-(1) | USY | 5.1 | 24.45 | 700 | 4 | 9 |
|  | Catalyst b-(6) | 33 | Zeolite b-(4) | USY | 5.1 | 24.40 | 720 | 4 | 9 |
| Comparative 8 | Catalyst a-(1) | 67 | Zeolite a-(1) | USY | 5.1 | 24.45 | 700 | 4 | 9 |
|  | Catalyst b-(7) | 33 | Zeolite b-(5) | USY | 5.1 | 24.65 | 610 | 4 | 9 |

| | | Mixture slurry | | | | | |
|---|---|---|---|---|---|---|---|
| | | Matrix-forming component | | | | | |
| | | Binding material | | Filler (1) | | Filler (2) | |
| | | type | concentration mass % | type | concentration mass % | type | concentration mass % |
| Comparative 1 | Catalyst a-(1) | Silica hydrosol | 6 | Kaolin | 13.5 | Activated Alumina | 1.5 |
| | — | — | — | — | — | — | — |
| Comparative 2 | Catalyst a-(1) | Silica hydrosol | 6 | Kaolin | 13.5 | Activated Alumina | 1.5 |
| | — | — | — | — | — | — | — |
| Comparative 3 | Catalyst a-(1) | Silica hydrosol | 6 | Kaolin | 13.5 | Activated Alumina | 1.5 |
| | — | — | — | — | — | — | — |
| Comparative 4 | — | — | — | — | — | — | — |
| | Catalyst b-(1) | Silica hydrosol | 6 | Kaolin | 13.5 | Activated Alumina | 1.5 |
| Comparative 5 | Catalyst a-(4) | Silica hydrosol | 6 | Kaolin | 13.5 | Activated Alumina | 1.5 |
| | Catalyst b-(1) | Silica hydrosol | 6 | Kaolin | 13.5 | Activated Alumina | 1.5 |
| Comparative 6 | Catalyst a-(5) | Silica hydrosol | 6 | Kaolin | 13.5 | Activated Alumina | 1.5 |
| | Catalyst b-(1) | Silica hydrosol | 6 | Kaolin | 13.5 | Activated Alumina | 1.5 |
| Comparative 7 | Catalyst a-(1) | Silica hydrosol | 6 | Kaolin | 13.5 | Activated Alumina | 1.5 |
| | Catalyst b-(6) | Silica hydrosol | 6 | Kaolin | 13.5 | Activated Alumina | 1.5 |
| Comparative 8 | Catalyst a-(1) | Silica hydrosol | 6 | Kaolin | 13.5 | Activated Alumina | 1.5 |
| | Catalyst b-(7) | Silica hydrosol | 6 | Kaolin | 13.5 | Activated Alumina | 1.5 |

TABLE 2-2

| | | Manufacturing of hydrocarbon catalytic cracking catalyst | | | | | | | | | | |
|---|---|---|---|---|---|---|---|---|---|---|---|---|
| | | Spray dry | | Supporting of rare earths | | | Supporting of magnesium oxide | | | Supporting of phosphorous oxide | | |
| | | | | Rare earth compound | | | Magnesium compound | | | Phosphorous Compound | | |
| | | Mixing ratio mass % | Inlet temperature° C. | Outlet temperature° C. | type | used amount mass % | pH | type | used amount mass % | pH | type | used amount mass % | pH |
| Comparative 1 | Catalyst a-(1) | 100 | 250 | 150 | RECl3 | 2 | 5.5 | — | — | — | — | — | — |
| Comparative 2 | Catalyst a-(1) | 100 | 250 | 150 | RECl3 | 1 | 5.5 | — | — | — | — | — | — |
| Comparative 3 | Catalyst a-(1) | 100 | 250 | 150 | RECl3 | 0 | 5.5 | — | — | — | — | — | — |
| Comparative 4 | — | — | — | — | — | — | — | — | — | — | — | — | — |
| | Catalyst b-(1) | 100 | 250 | 150 | — | — | — | MgCl2 | 1 | 5.5 | H3PO4 | 0.4 | 4 |

TABLE 2-2-continued

| | | Manufacturing of hydrocarbon catalytic cracking catalyst | | | | | | | | | | |
|---|---|---|---|---|---|---|---|---|---|---|---|---|
| | | | Spray dry | | Supporting of rare earths | | Supporting of magnesium oxide | | Supporting of phosphorous oxide | | | |
| | | | | | Rare earth compound | | Magnesium compound | | Phosphorous Compound | | | |
| | | Mixing ratio mass % | Inlet temperature° C. | Outlet temperature° C. | type | used amount mass % | pH | type | used amount mass % | pH | type | used amount mass % | pH |
| Comparative 5 | Catalyst a-(4) | 67 | 250 | 150 | RECl3 | 2 | 5.5 | — | — | — | — | — | — |
| | Catalyst b-(1) | 33 | 250 | 150 | — | — | — | MgCl2 | 1 | 5.5 | H3PO4 | 0.4 | 4 |
| Comparative 6 | Catalyst a-(5) | 67 | 250 | 150 | RECl3 | 2 | 5.5 | — | — | — | — | — | — |
| | Catalyst b-(1) | 33 | 250 | 150 | — | — | — | MgCl2 | 1 | 5.5 | H3PO4 | 0.4 | 4 |
| Comparative 7 | Catalyst a-(1) | 67 | 250 | 150 | RECl3 | 2 | 5.5 | — | — | — | — | — | — |
| | Catalyst b-(6) | 33 | 250 | 150 | — | — | — | MgCl2 | 1 | 5.5 | H3PO4 | 0.4 | 4 |
| Comparative 8 | Catalyst a-(1) | 67 | 250 | 150 | RECl3 | 2 | 5.5 | — | — | — | — | — | — |
| | Catalyst b-(7) | 33 | 250 | 150 | — | — | — | MgCl2 | 1 | 5.5 | H3PO4 | 0.4 | 4 |

TABLE 2-3

| | | Hydrocarbon catalytic cracking catalyst | | | | | | | | | | | |
|---|---|---|---|---|---|---|---|---|---|---|---|---|---|
| | | Mixing ratio mass % | Faujasite-type zeolite content mass % | Binding material content mass % | Filler (1) content mass % | Filler (2) content mass % | Matrix/Zeolite mass ratio | $RE_2O_3$ content mass % | MgO content mass % | $P_2O_5$ content mass % | $(C_M)/(C_Z)$ mass ratio | $(C_P)/(C_M)$ mass ratio | Mean particle diameter μm |
| Comparative 1 | Catalyst a-(1) | 100 | 29.4 | 19.6 | 44.1 | 4.9 | 0.17 | 2 | — | — | — | — | 65 |
| | — | — | — | — | — | — | — | — | — | — | — | — | — |
| Comparative 2 | Catalyst a-(1) | 100 | 29.7 | 19.8 | 44.6 | 5.0 | 0.17 | 1 | — | — | — | — | 65 |
| | — | — | — | — | — | — | — | — | — | — | — | — | — |
| Comparative 3 | Catalyst a-(1) | 100 | 30.0 | 20.0 | 45.0 | 5.0 | 0.17 | 0 | — | — | — | — | 65 |
| | — | — | — | — | — | — | — | — | — | — | — | — | — |
| Comparative A | — | — | — | — | — | — | — | — | — | — | — | — | — |
| | Catalyst b-(1) | 100 | 29.6 | 19.7 | 44.4 | 4.9 | 0.17 | — | 1 | 0.4 | 0.034 | 0.40 | 65 |
| Comparative 5 | Catalyst a-(4) | 67 | 29.4 | 19.6 | 44.1 | 4.9 | 0.17 | 2 | — | — | — | — | 65 |
| | Catalyst b-(1) | 33 | 29.6 | 19.7 | 44.4 | 4.9 | 0.17 | — | 1 | 0.4 | 0.034 | 0.40 | 65 |
| Comparative 6 | Catalyst a-(5) | 67 | 29.4 | 19.6 | 44.1 | 4.9 | 0.17 | 2 | — | — | — | — | 65 |
| | Catalyst b-(1) | 33 | 29.6 | 19.7 | 44.4 | 4.9 | 0.17 | — | 1 | 0.4 | 0.034 | 0.40 | 65 |
| Comparative 7 | Catalyst a-(1) | 67 | 29.4 | 19.6 | 44.1 | 4.9 | 0.17 | 2 | — | — | — | — | 65 |
| | Catalyst b-(6) | 33 | 29.6 | 19.7 | 44.4 | 4.9 | 0.17 | — | 1 | 0.4 | 0.034 | 0.40 | 65 |
| Comparative 8 | Catalyst a-(1) | 67 | 29.4 | 19.6 | 44.1 | 4.9 | 0.17 | 2 | — | — | — | — | 65 |
| | Catalyst b-(7) | 33 | 29.6 | 19.7 | 44.4 | 4.9 | 0.17 | — | 1 | 0.4 | 0.034 | 0.40 | 65 |

TABLE 2-4

| | | Activity | | | | | | | |
|---|---|---|---|---|---|---|---|---|---|
| | | Mixing ratio mass % | Inversion rate mass % | $H_2$ mass % | LPG mass % | Gasoline mass % | LCO mass % | HCO mass % | Coke mass % |
| Comparative 1 | Catalyst a-(1) | 100 | 72.35 | 0.28 | 16.80 | 49.55 | 15.92 | 11.73 | 4.18 |
| | — | — | | | | | | | |
| Comparative 2 | Catalyst a-(1) | 100 | 70.12 | 0.31 | 16.35 | 47.37 | 16.67 | 13.21 | 4.52 |
| | — | — | | | | | | | |
| Comparative 3 | Catalyst a-(1) | 100 | 67.83 | 0.34 | 15.86 | 45.10 | 16.85 | 15.32 | 4.93 |
| | — | — | | | | | | | |
| Comparative 4 | — | — | 68.88 | 0.37 | 14.60 | 48.17 | 17.74 | 13.38 | 4.23 |
| | Catalyst b-(1) | 100 | | | | | | | |
| Comparative 5 | Catalyst a-(4) | 67 | 70.63 | 0.27 | 16.00 | 48.45 | 16.61 | 12.76 | 4.39 |
| | Catalyst b-(1) | 33 | | | | | | | |
| Comparative 6 | Catalyst a-(5) | 67 | 70.60 | 0.34 | 15.83 | 48.14 | 16.87 | 12.53 | 4.62 |
| | Catalyst b-(1) | 33 | | | | | | | |
| Comparative 7 | Catalyst a-(1) | 67 | 70.07 | 0.35 | 16.52 | 47.17 | 16.60 | 13.33 | 4.49 |
| | Catalyst b-(6) | 33 | | | | | | | |
| Comparative 8 | Catalyst a-(1) | 67 | 69.50 | 0.34 | 16.39 | 46.56 | 17.02 | 13.48 | 4.69 |
| | Catalyst b-(7) | 33 | | | | | | | |

Evaluation Results

It is understood from the results in Tables 1-4 and 2-4 that the catalysts in Examples 1 to 9 exhibit an excellent hydrothermal stability, a high residual oil (bottom) cracking ability and an excellent selectivity (a high liquid yield, a low gas and a low coke) since the catalysts in Examples 1 to 9 are provided by a mixture of predetermined two catalysts. On the other hand, since the mixture of the predetermined catalysts of the invention is not used in Comparatives, the catalysts in Comparatives do not provide sufficient effects as a hydrocarbon catalytic cracking catalyst.

The invention claimed is:

1. A catalyst for hydrocarbon catalytic cracking, comprising:
    a catalyst (a) comprising faujasite-type zeolite (A) having a unit cell size in a range of 2.435 nm to 2.455 nm, a matrix component, and rare earths; and
    a catalyst (b) comprising faujasite-type zeolite (B) having a unit cell size in a range of 2.445 nm to 2.462 nm, a matrix component, phosphorous, and magnesium.

2. The catalyst for hydrocarbon catalytic cracking according to claim 1, wherein
    a mixing mass ratio ((a)/(b)) of the catalyst (a) to the catalyst (b) is in a range of 10/90 to 90/10.

3. The catalyst for hydrocarbon catalytic cracking according to claim 1, wherein
    a content ($C_{ZA}$) of the faujasite-type zeolite (A) in the catalyst (a) is in a range of 10 mass % to 50 mass % in terms of a dry solid based on the catalyst (a).

4. The catalyst for hydrocarbon catalytic cracking according to claim 1, wherein
    a content ($C_{REA}$) of the rare earths in the catalyst (a) is in a range of 0.5 mass % to 5 mass % in terms of $RE_2O_3$ based on the catalyst (a).

5. The catalyst for hydrocarbon catalytic cracking according to claim 1, wherein
    a content ($C_{ZB}$) of the faujasite-type zeolite (B) in the catalyst (b) is in a range of 10 mass % to 50 mass % in terms of a dry solid based on the catalyst (b).

6. The catalyst for hydrocarbon catalytic cracking according to claim 1, wherein
    a content ($C_P$) of the phosphorous in the catalyst (b) is in a range of 0.1 mass % to 10 mass % in terms of $P_2O_5$ based on the catalyst (b).

7. The catalyst for hydrocarbon catalytic cracking according to claim 1, wherein
    a content ($C_M$) of the magnesium in the catalyst (b) is in a range of 0.05 mass % to 3 mass % in terms of MgO based on the catalyst (b).

8. The catalyst for hydrocarbon catalytic cracking according to claim 1, wherein
    a ratio ($C_P$)/($C_M$) between the content ($C_P$) of the phosphorous and the content ($C_M$) of the magnesium in the catalyst (b) is in a range of 0.1 to 8.

9. The catalyst for hydrocarbon catalytic cracking according to claim 1, wherein
    a ratio ($C_M$)/($C_{ZB}$) between the content ($C_M$) of the magnesium and the content ($C_{ZB}$) of the faujasite-type zeolite in the catalyst (b) is in a range of 0.001 to 0.1.

* * * * *